(12) United States Patent
Kondo et al.

(10) Patent No.: US 7,010,737 B2
(45) Date of Patent: Mar. 7, 2006

(54) METHOD AND APPARATUS FOR ERROR DATA RECOVERY

(75) Inventors: Tetsujiro Kondo, Kanagawa (JP); Sugata Ghosal, San Jose, CA (US); Yasuhiro Fujimori, Cupertino, CA (US); James J. Carrig, San Jose, CA (US); Yasuaki Takahashi, Kanagawa (JP); Takahiro Nagano, Saitama (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 110 days.

(21) Appl. No.: 09/249,489

(22) Filed: Feb. 12, 1999

(65) Prior Publication Data

US 2003/0212944 A1    Nov. 13, 2003

(51) Int. Cl.
*G06F 11/30* (2006.01)
*G08C 25/00* (2006.01)
*H03M 13/00* (2006.01)
*H04L 1/00* (2006.01)

(52) U.S. Cl. .................. 714/746; 714/752; 714/786
(58) Field of Classification Search ............... 370/473; 714/785, 752, 774, 746, 778, 760, 789, 786, 714/799, 797; 375/240; 382/232; 704/235, 704/253, 238, 240; 341/51
See application file for complete search history.

(56) References Cited

U.S. PATENT DOCUMENTS

| 3,311,879 A | 3/1967 | Daher |
| 3,665,396 A * | 5/1972 | Forney Jr. ................ 714/789 |
| 3,805,232 A | 4/1974 | Allen |
| 4,361,853 A | 11/1982 | Remy et al. |
| 4,381,519 A | 4/1983 | Wilkinson et al. ........ 358/21 R |
| 4,419,693 A | 12/1983 | Wilkinson ................ 358/167 |
| 4,532,628 A | 7/1985 | Matthews |
| 4,574,393 A | 3/1986 | Blackwell et al. |
| 4,703,351 A | 10/1987 | Kondo .................... 358/135 |
| 4,703,352 A | 10/1987 | Kondo .................... 358/135 |
| 4,710,811 A | 12/1987 | Kondo .................... 358/135 |
| 4,722,003 A | 1/1988 | Kondo .................... 358/135 |
| 4,729,021 A | 3/1988 | Kondo |
| 4,772,947 A | 9/1988 | Kono ..................... 358/135 |

(Continued)

FOREIGN PATENT DOCUMENTS

EP      0 398 741 A    11/1990

(Continued)

OTHER PUBLICATIONS

Chan, et al., "Block Shuffling and Adaptive Interleaving for Still Image Transmission Over Rayleigh Fading Channels", pp. 1002-1011, IEEE Transactions on Vehicular Technology, vol. 48, No. 3, May 1999.

(Continued)

*Primary Examiner*—Guy Lamarre
*Assistant Examiner*—Mujtaba Chaudry
(74) *Attorney, Agent, or Firm*—Blakely, Sokoloff, Taylor & Zafman LLP

(57) ABSTRACT

The present invention provides a mechanism for preventing quality degradation of decoded data during the decoding of encoded data. In one embodiment, error propagation is detected and corresponding data is flagged. An error recovery process is then applied to the flagged data. In an alternate embodiment, scores for hypotheses are calculated for lost/ damaged data. A score distribution is used for detection of the false hypotheses. The data are flagged if their score distribution is within a range defined by a threshold and an error recovery process is applied to recover those data having associated error flags set.

92 Claims, 14 Drawing Sheets

SYSTEM PROPOSAL FOR ERROR RECOVERY

U.S. PATENT DOCUMENTS

| Number | Date | Inventor | Class |
|---|---|---|---|
| 4,788,589 A | 11/1988 | Kondo | 358/133 |
| 4,815,078 A | 3/1989 | Shimura | 370/30 |
| 4,845,560 A | 7/1989 | Kondo et al. | 358/133 |
| 4,890,161 A | 12/1989 | Kondo | 358/135 |
| 4,924,310 A | 5/1990 | von Brandt | 358/136 |
| 4,953,023 A | 8/1990 | Kondo | 358/135 |
| 4,975,915 A | 12/1990 | Sako et al. | |
| 5,023,710 A | 6/1991 | Kondo et al. | 358/133 |
| 5,086,489 A | 2/1992 | Shimura | |
| 5,093,872 A | 3/1992 | Tutt | |
| 5,101,446 A | 3/1992 | Resnikoff et al. | |
| 5,122,873 A | 6/1992 | Golin | |
| 5,134,479 A | 7/1992 | Ohishi | |
| 5,142,537 A | 8/1992 | Kutner et al. | 371/31 |
| 5,150,210 A | 9/1992 | Hoshi et al. | |
| 5,159,452 A | 10/1992 | Kinoshita | |
| 5,166,987 A | 11/1992 | Kageyama | |
| 5,177,797 A | 1/1993 | Takenaka et al. | |
| 5,185,746 A | 2/1993 | Tanaka et al. | |
| 5,196,931 A | 3/1993 | Kondo | 358/133 |
| 5,208,816 A | 5/1993 | Seshardi et al. | 371/43 |
| 5,237,424 A | 8/1993 | Nishino et al. | 358/310 |
| 5,241,381 A | 8/1993 | Kondo | 358/133 |
| 5,243,428 A | 9/1993 | Challapali et al. | |
| 5,258,835 A | 11/1993 | Kato | 358/135 |
| 5,301,018 A | 4/1994 | Smidth et al. | |
| 5,307,175 A | 4/1994 | Seachman | |
| 5,321,748 A | 6/1994 | Zeidler et al. | |
| 5,327,502 A | 7/1994 | Katata et al. | 382/56 |
| 5,337,087 A | 8/1994 | Mishima | |
| 5,359,694 A | 10/1994 | Concordel | 358/445 |
| 5,379,072 A | 1/1995 | Kondo | 348/441 |
| 5,398,078 A | 3/1995 | Masuda et al. | 348/699 |
| 5,406,334 A | 4/1995 | Kondo et al. | |
| 5,416,651 A | 5/1995 | Uetake et al. | 360/48 |
| 5,416,847 A | 5/1995 | Boze | |
| 5,428,403 A | 6/1995 | Andrew et al. | 348/699 |
| 5,434,716 A | 7/1995 | Sugiyama et al. | 360/32 |
| 5,438,369 A | 8/1995 | Citta et al. | 348/470 |
| 5,446,456 A | 8/1995 | Seo | |
| 5,455,629 A | 10/1995 | Sun et al. | |
| 5,469,216 A | 11/1995 | Takahashi et al. | 348/441 |
| 5,469,474 A | 11/1995 | Kitabatake | |
| 5,471,501 A | 11/1995 | Parr et al. | 375/354 |
| 5,473,479 A | 12/1995 | Takahura | |
| 5,481,554 A | 1/1996 | Kondo | 371/53 |
| 5,481,627 A | 1/1996 | Kim | 382/254 |
| 5,490,177 A | 2/1996 | La Rosa et al. | |
| 5,495,298 A | 2/1996 | Uchida et al. | |
| 5,499,057 A | 3/1996 | Kondo et al. | |
| 5,552,608 A | 9/1996 | Gallagher et al. | 371/40.3 |
| 5,557,420 A | 9/1996 | Yanagihara et al. | |
| 5,557,479 A | 9/1996 | Yanagihara | |
| 5,571,862 A | 11/1996 | Williams et al. | |
| 5,577,053 A * | 11/1996 | Dent | 714/755 |
| 5,583,573 A | 12/1996 | Asamura et al. | |
| 5,594,807 A | 1/1997 | Liu | |
| 5,598,214 A | 1/1997 | Kondo et al. | 348/414 |
| 5,617,333 A | 4/1997 | Oyamada et al. | |
| 5,625,715 A | 4/1997 | Trew et al. | 382/236 |
| 5,636,316 A | 6/1997 | Oku et al. | |
| 5,649,053 A | 7/1997 | Kim | |
| 5,663,764 A | 9/1997 | Kondo et al. | 348/414 |
| 5,673,357 A | 9/1997 | Shima | |
| 5,677,734 A | 10/1997 | Oikawa et al. | |
| 5,689,302 A | 11/1997 | Jones | |
| 5,699,475 A | 12/1997 | Oguro et al. | |
| 5,703,889 A | 12/1997 | Shimoda et al. | 371/55 |
| 5,712,957 A * | 1/1998 | Waibel et al. | 704/240 |
| 5,724,099 A | 3/1998 | Hamdi et al. | |
| 5,724,369 A | 3/1998 | Brailean et al. | |
| 5,737,022 A | 4/1998 | Yamaguchi et al. | |
| 5,751,361 A | 5/1998 | Kim | |
| 5,751,743 A | 5/1998 | Takizawa | 371/41 |
| 5,756,857 A | 5/1998 | Yamaguchi | |
| 5,790,195 A | 8/1998 | Ohsawa | |
| 5,796,786 A | 8/1998 | Lee | 375/326 |
| 5,805,762 A | 9/1998 | Boyce et al. | 386/68 |
| 5,809,231 A | 9/1998 | Yokoyama et al. | |
| 5,841,781 A | 11/1998 | Takeda | |
| 5,841,794 A | 11/1998 | Inoue et al. | |
| 5,852,470 A | 12/1998 | Kondo et al. | 348/448 |
| 5,855,000 A * | 12/1998 | Waibel et al. | 704/235 |
| 5,861,922 A | 1/1999 | Murashita et al. | |
| 5,878,183 A | 3/1999 | Sugiyama et al. | |
| 5,903,481 A | 5/1999 | Kondo et al. | |
| 5,936,674 A | 8/1999 | Kim | |
| 5,938,318 A | 8/1999 | Araki | |
| 5,940,411 A | 8/1999 | Takeda | |
| 5,944,851 A | 8/1999 | Lee | |
| 5,946,044 A | 8/1999 | Kondo et al. | |
| 5,987,183 A | 11/1999 | Saunders et al. | |
| 6,052,814 A | 4/2000 | Karasawa | |
| 6,065,119 A | 5/2000 | Sandford, II et al. | |
| 6,067,636 A | 5/2000 | Yao et al. | |
| 6,078,700 A * | 6/2000 | Sarachik | 382/291 |
| 6,191,710 B1 | 2/2001 | Waletzki | |
| 6,356,661 B1 * | 3/2002 | Wen | 382/233 |

FOREIGN PATENT DOCUMENTS

| | | |
|---|---|---|
| EP | 0 527 611 | 8/1992 |
| EP | 0 558 016 | 2/1993 |
| EP | 0 566 412 A2 | 4/1993 |
| EP | 0 571 180 A2 | 5/1993 |
| EP | 0 592 196 A2 | 10/1993 |
| EP | 0 596 826 | 11/1993 |
| EP | 0 605 209 A2 | 12/1993 |
| EP | 0 610 587 | 12/1993 |
| EP | 0 597 576 A | 5/1994 |
| EP | 0 651 584 A2 | 10/1994 |
| EP | 0 680 209 | 4/1995 |
| EP | 0 746 157 A2 | 5/1996 |
| EP | 0 806 872 A2 | 12/1997 |
| EP | 0 833 517 | 4/1998 |
| GB | 2 320 836 A | 11/1997 |
| JP | 7-67028 | 3/1995 |
| WO | WO96/07987 | 9/1995 |
| WO | WO99/21285 | 10/1998 |
| WO | 99 21090 A | 4/1999 |
| WO | 99/21369 | 4/1999 |
| WO | 01/01702 A1 | 1/2001 |

OTHER PUBLICATIONS

Kondo, et al., "*New ADRC For Consumer Digital VCR*", pp. 144-150, Sony Corporation, Japan.

Caglar et al., "*New Efficient Shuffled Block Transform Design Technique*", pp. 834-835, Electronics Letters, May 26th, vol. 30, No. 11.

International Search Report, PCT/US98/22412, Oct. 5, 1999, 5 pgs.

Chan, et al., "*Block Shuffling and Adaptive Interleaving for Still Image Transmission Over Rayleigh Fading Channels*", pp. 1002-1011, IEEE Transactions on Vehicular Technology, vol. 48, No. 3, May 1999.

Kondo, et al., "*New ADRC For Consumer Digital VCR*", pp. 144-150, Sony Corporation, Japan.

Caglar et al., "*New Efficient Shuffled Block Transform Design Technique*", pp. 834-835, Electronics Letters, May 26th, 1994, vol. 30, No. 11.

International Search Report PCT/US00/03439, Feb. 9, 2000, 8 pgs.

International Search Report PCT/US00/03595, Feb. 10, 2000, 6 pgs.
International Search Report PCT/US00/03611, Feb. 10, 2000, 8 pgs.
International Search Report PCT/US00/03599, Feb. 10, 2000, 4 pgs.
International Search Report PCT/US00/03742, Feb. 11, 2000, 5 pgs.
International Search Report PCT/US00/03654, Feb. 10, 2000, 4 pgs.
International Search Report PCT/US00/03299, Feb. 9, 2000, 5 pgs.
Merguro, et al., "An Adaptive Order Statistics Filter Based On Fuzzy Rules For Image Processing", pp. 70-80, XP-00755627, 1997 Scripta Technica, Inc.
International Search Report PCT/US00/03743, 4 pgs., Feb. 11, 2000.
Jeng, et al., "Concealment of Bit Error And Cell Loss In Inter-Frame Coded Video Transmission", 1991 IEEE, 17.4.1-17.4.5.
Monet, et al., "Block Adaptive Ouantization Of Images", IEEE 1993, pp. 303-306.
Stammnitz, et al., "Digital HDTV Experimental System", pp. 535-542.
International Search Report PCT/US00/035508, Feb 9, 2000, 8 pgs.
Chu, et al., Detection and Concealment of Transmission Errors in H.261 Images, XP-000737027, pp. 74-84, IEEE transactions, Feb. 1998.
Japanese Patent No. 05304659 and translation of Abstract.
Japanese Patent No. 05244578 and translation of Abstract.
Japanese Patent No. 05300485 and translation of Abstract.
Japanese Patent No. 06070298 and translation of Abstract.
Japanese Patent No. 06006778 and translation of Abstract.
Japanese Patent No. 06113256 and translation of Abstract.
Japanese Patent No. 06113275 and translation of Abstract.
Japanese Patent No. 06253287 and translation of Abstract.
Japanese Patent No. 06253280 and translation of Abstract.
Japanese Patent No. 06253284 and translation of Abstract.
Japanese Patent No. 06350981 and translation of Abstract.
Japanese Patent No. 06350982 and translation of Abstract.
Japanese Patent No. 08317394 and translation of Abstract.
Japanese Patent No. 07023388 and translation of Abstract.
Japanese Patent No. 04245881 and translation of Abstract.
Japanese Patent No. 04115628 and translation of Abstract.
Japanese Patent No. 04115686 and translation of Abstract.
Translation of Abstract of Japanese Patent No. 61147690.
Translation of Abstract of Japanese Patent No. 63256080.
Translation of Abstract of Japanese Patent No. 63257390.
Translation of Abstract of Japanese Patent No. 02194785.
Translation of Abstract of Japanese Patent No. 03024885.
Translation of Abstract of Japanese Patent No. 04037293.
Translation of Abstract of Japanese Patent No. 04316293.
Translation of Abstract of Japanese Patent No. 04329088.
Translation of Abstract of Japanese Patent No. 05047116.
Translation of Abstract of Japanese Patent No. 05244579.
Translation of Abstract of Japanese Patent No. 05244580.
Translation of Abstract of Japanese Patent No. 05244559.
Translation of Abstract of Japanese Patent No. 05304659.
Translation of Abstract of Japanese Patent No. 06086259.
Translation of Abstract of Japanese Patent No. 06113258.
Translation of Abstract of Japanese Patent No. 06125534.
Translation of Abstract of Japanese Patent No. 06162693.
Translation of Abstract of Japanese Patent No. 06253287.
Translation of Abstract of Japanese Patent No. 06253280.
Translation of Abstract of Japanese Patent No. 06253284.
Translation of Abstract of Japanese Patent No. 07046604.
Translation of Abstract of Japanese Patent No. 07085611.
Translation of Abstract of Japanese Patent No. 07095581.
Translation of Abstract of Japanese Patent No. 07177505.
Translation of Abstract of Japanese Patent No. 07177506.
Translation of Abstract of Japanese Patent No. 07240903.
International Search Report, PCT/US98/22412, Oct. 5, 1999, 5 pgs.
R. C. Gonzalez, et al., "Digital Image Processing", Addison Wesley Publishing Company, Inc., 1992, pp. 346-348.
R. Aravind, et al., "Image and Video Coding Standards", AT&T Technical Journal, Jan./Feb. 1993, pp. 67-88.
Zhu, et al., "Coding and Cell-Loss Recovery in DCT-Based Packet Video", IEEE Transactions on Circuits and Systems for Video Technology, Jun. 3, 1993, No. 3, NY.
International Search Report, PCT/US98/22347, Mar. 16, 1999, 2 pgs.
International Search Report, PCT/US95/22531, Apr. 1, 1999, 1 pg.
International Search Report, PCT/US98/22411, Feb. 25, 1999, 1 pg.
NHK Laboratories Note, "Error Correction, Concealment and Shuffling", No. 424, Mar. 1994, pp. 29-44.
Translation of Japanese Patent #7-67028, 30 pgs.
Kondo, et al., "Adaptive Dynamic Range Coding Scheme for Futute Consumer Digital VTR", pp. 219-226.
Kim, et al., "Bit Rate Reduction Algorithm for a Digital VCR", IEEE Transactions on Consumer Electronics, vol. 37, No. 3, Aug. 1, 1992, pp. 267-274.
Kondo, et al., "Adaptive Dynamic Range Coding Scheme for Future HDTV Digital VTR", Fourth International Workshop on HDTV and Beyond, Sep. 4-6, Turin, Italy.
Kondo, et al., "A New Concealment Method for Digital VCR's", IEEE Visual Signal Processing and Communication, pp. 20-22, Sep. 1993, Melbourne, Austraila.
Park, et al., "A Simple Concealment for ATM Bursty Cell Loss", IEEE Tranactions on Consumer Electronics, No. 3, Aug. 1993, pp. 704-709.
Tom et al., "Packet Video for Cell Loss Protection Using Deinterleaving and Scrambling", ICASSP 91: 1991 International Conference on Acoustics, Speech and Signal Processing, vol. 4, pp. 2857-2860, Apr. 1991.

* cited by examiner

METHOD AND APPARATUS FOR ERROR DATA RECOVERY

BACKGROUND OF THE INVENTION

1. Field of the Invention

The present invention relates to the recovery of lost or damaged encoded data. More particularly, the present invention relates to the minimizing of quality degradation caused by error propagation in bitstreams containing lost or damaged encoded data.

2. Art Background

It is quite common to compress data to minimize transmission or storage bandwidth requirements. One type of compression process is referred to as variable length coding. In variable length coding processes, the signal is typically divided into several localized regions, also referred to as blocks, and is coded by quantizing each region according to its signal activity level. In an exemplary signal such as signals representative of digital images, different parts of the images have different activity levels and are therefore coded with a different number of quantization bits.

The information regarding the number of quantization bits used for coding different regions is used by the decoder to delineate the respective quantization bits of each block from the received bitstream, which in turn is used to decode the blocks. Therefore, when the information regarding the number of quantization bits used to encode data is lost, a recovery process is implemented to estimate the number of quantization bits used to generate the codes representative of the data. If the number of quantization bits is not accurately estimated, the error incurred will propagate through the bitstream as the decoder is unable to determine the location of the end of one block, and therefore the beginning of the next block.

One type of variable length encoding is known as Adaptive Dynamic Range Coding (ADRC). For further information regarding ADRC, see, "Adaptive Dynamic Range Coding Scheme for Future HDTV Digital VTR", Kondo, Fujimori, Nakaya, Fourth International Workshop on HDTV and Beyond, Sep. 4–6, 1991, Turin, Italy.

In one example of ADRC, blocks are encoded using a minimum pixel value (MIN), the dynamic range (DR) of pixel values in the block, the motion flag (MF) indicative of temporal activity and the quantization codes (Q codes) representative of each pixel in a block. The Q codes are generated based upon a minimum value, quantization step and the original pixel value. The quantization step is determined by the DR of the block and the number of quantization bits (Qbit), wherein the Qbit is a function of DR.

When the encoded bits are received in the decoder, the Qbit and MF information of each block is needed to delineate the portion of the bitstream corresponding to each block, and in turn to decode the block. If the DR and/or MF of the block is damaged, it is necessary to recover or estimate the information in order that the blocks can be decoded. At the same time, in case of a recovery failure, this error will likely result in incorrect decoding of the rest of the blocks and, in turn, severe picture degradation, since the starting point of subsequent blocks in the bitstream will be incorrectly identified.

SUMMARY OF THE INVENTION

The present invention provides a mechanism for preventing quality degradation of decoded data during the decoding of encoded data. In one embodiment, error propagation is detected and corresponding data is flagged. An error recovery process is then applied to the flagged data. In an alternate embodiment, hypotheses are calculated for lost/damaged data. A score distribution is used for detection of the false hypotheses. The data are flagged if their score distribution is within a range defined by a threshold and an error recovery process is applied to recover those data having associated error flags set.

BRIEF DESCRIPTION OF THE DRAWINGS

The objects, features and advantages of the present invention will be apparent to one skilled in the art in light of the following description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The system and method of the present invention provides an innovative mechanism for preventing quality degradation caused by error propagation in variable length encoded data. The discussion herein is directed to the recovery of image data, and in particular, Adaptive Dynamic Range Coding (ADRC). However, the invention is not limited to image data and can be applied to other types of correlated data including audio data. Furthermore, the present invention is not limited to ADRC; other variable length encoding processes may also be used. For example, the present invention is applicable to coding processes using Discrete Cosine Transform (DCT). In one embodiment, DCT coefficients of individual blocks can be quantized based upon respective activity levels, and the quantized coefficients are transmitted.

Figure 1A:
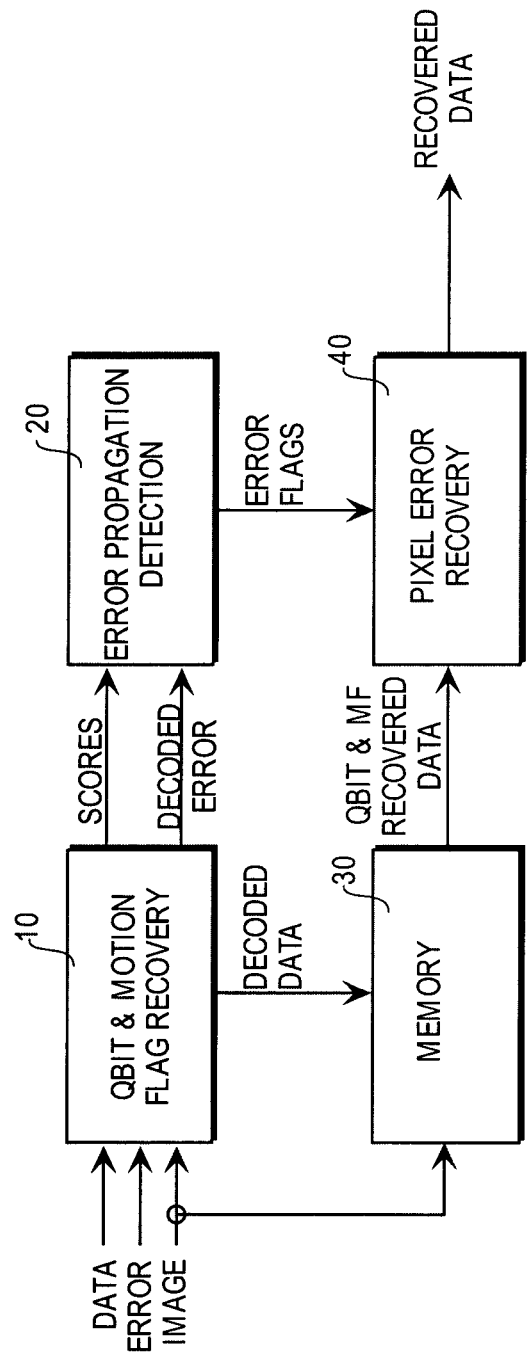
FIG. 1a illustrates one embodiment of a system of the present invention.

One embodiment of a system that operates in accordance with the teachings of the present invention is illustrated in FIG. 1a. The encoded bitstream of data, error flags indicating portions of data that are lost or damaged (lost/damaged), and decoded data (referred to in this example as image data) are input to Qbit and Motion Flag recovery circuit 10. The Qbit and Motion Flag recovery circuit 10 generates hypotheses for a number of quantization bits (Qbit) used and motion flag (MF) possible values. As will be described in more detail below, a score is generated with respect to each hypothesis and the hypothesis with the best score, e.g., minimum score, is selected as the recovered values. The data decoded using the selected hypothesis is output as the decoded data to the memory 30.

The scores and error flags corresponding to data decoded using the selected hypothesis is input to error propagation detection circuit 20. As will be discussed below, error propagation detection circuit 20 evaluates hypotheses to generate hypotheses results used to detect error propagation. In one embodiment, circuit 20 examines the score distribution and detects error propagation due to false candidate decoding. Other evaluation techniques may be used, including evaluation of score distribution patterns or other metrics. Pixel error recovery block 40, receives the decoded data error flags as well as flags that may have been generated by the error propagation detection circuit 20 to indicate that pixel error recovery is warranted and performs a pixel error recovery process to recover pixel data that may not be correct due to error propagation.

Figure 1B:
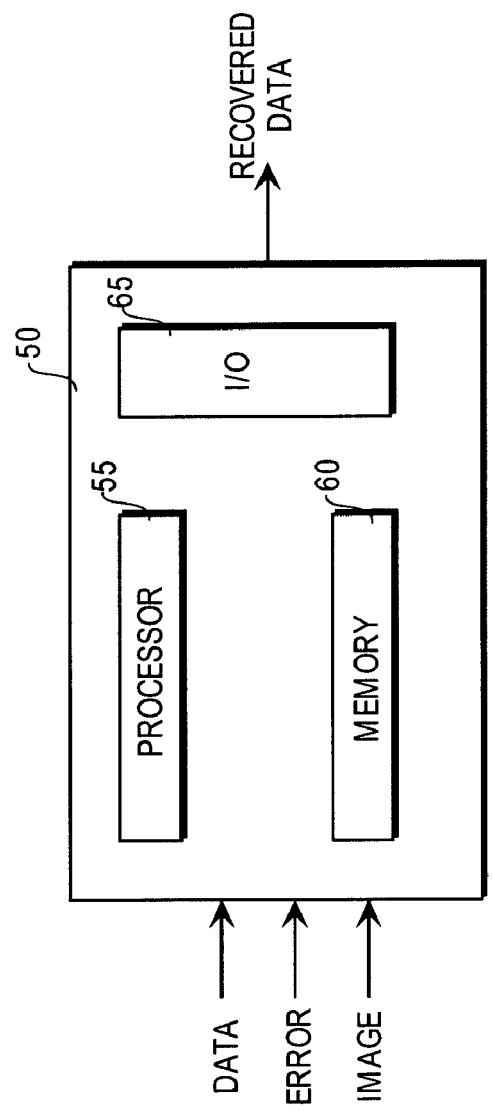
FIG. 1b illustrates an alternate embodiment of the system of the present invention.

An alternate embodiment is illustrated in FIG. 1b. In this embodiment, a general purpose or specially configured processing system 50 performs the methods described herein. In this embodiment, the processing system 50 includes a processor 55, a memory 60 and input/output circuitry 65. Other circuitry not shown herein may also be included.

In one embodiment, the memory can store instructions, which when executed by processing system 50, perform the methods described herein. Alternately, the instructions may be stored on other storage media or transmitted across a transmission media, such as a network, to the processor 55. Memory 60 can also be configured to store data used and generated as described herein.

Input/output circuitry 65, receives the encoded data, error flags and image data for processing by processing system 50 and outputs the recovered data generated.

Figure 1C:
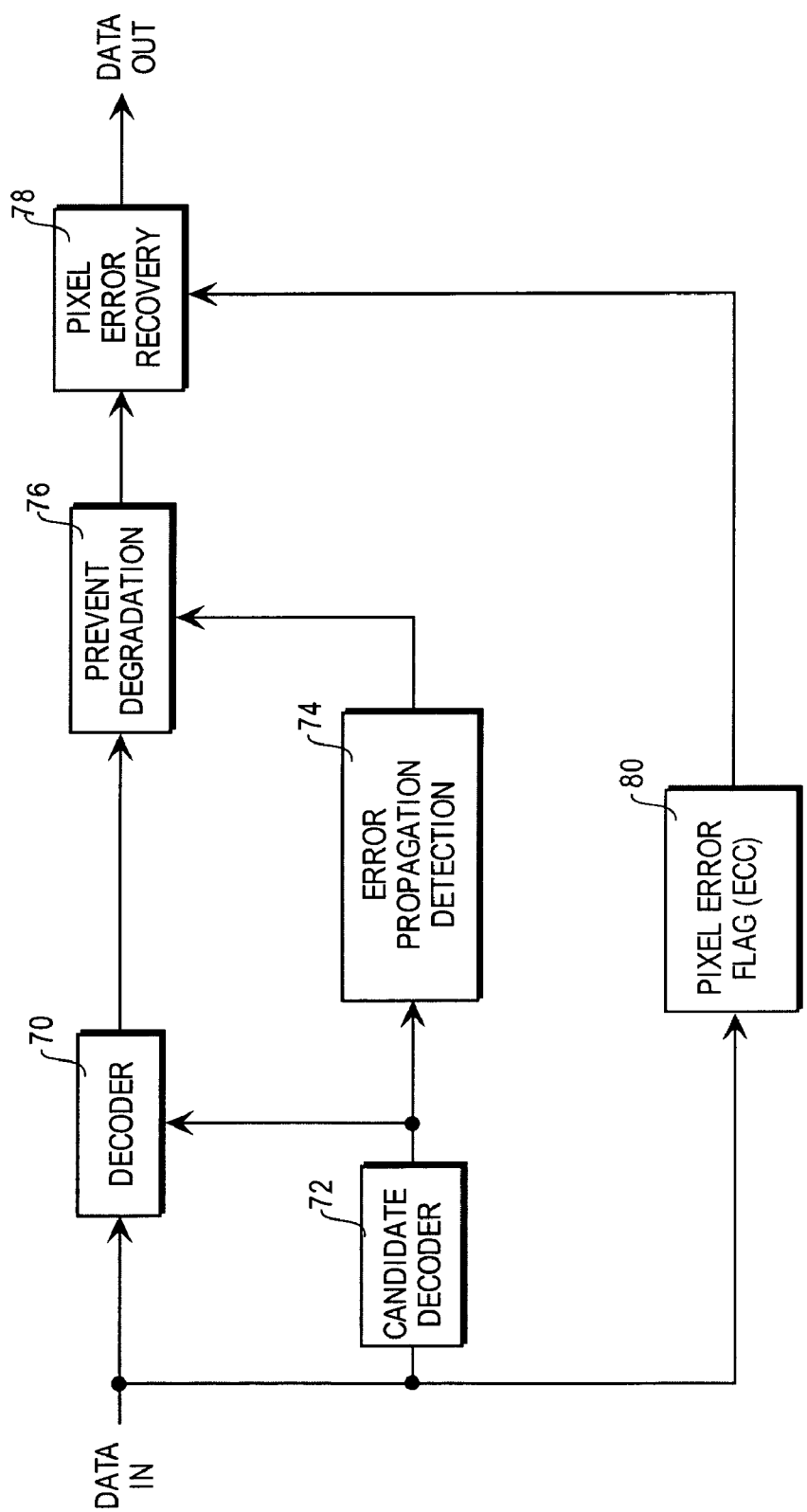
FIG. 1c illustrates an alternate embodiment of the system of the present invention.

An alternate embodiment is illustrated by FIG. 1c. In this embodiment, the bitstream of data is input into decoder 70 and candidate decoder 72. The decoder 70 decodes those portions of the bitstream that are decodable using standard available decoding processes, i.e., portions containing no errors. Candidate decoder 72 generates candidate decodings and selects a best candidate decoding as discussed herein. Error propagation detection circuit 74 detects errors which occur due to error propagation, for example, those errors caused by selection of an incorrect candidate decoding. The prevent degradation circuit 76 receives the decoded data output by decoder 70 and error propagation flags generated by error propagation detection circuit 74 and performs block processing to recover blocks of data flagged to have errors. In one embodiment, block processing estimates block data using neighboring block data. Other block processing techniques may be used.

Pixel error flag circuit 80 receives flags indicating the pixel data which may contain errors. Typically, the flags are generated using known Error Correction Code (ECC) techniques.

Pixel error recovery circuit 78 receives input from prevent degradation circuit 76 and pixel error flag circuit 80 and performs a pixel error recovery process data for having corresponding error flags set. A pixel error recovery process, such as the classified adaptive error recovery process discussed below, may be used.

Figure 2:
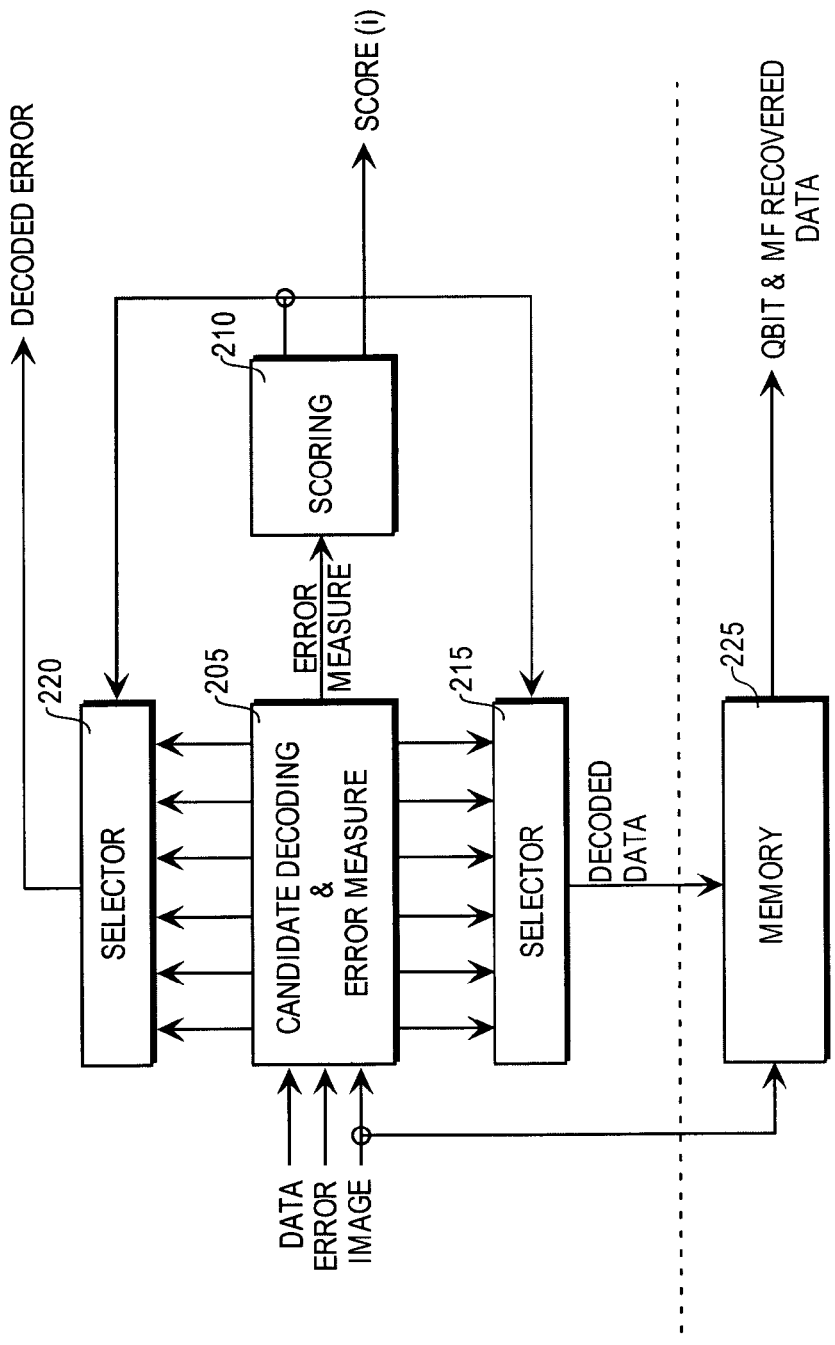
FIG. 2 is a block diagram illustration of one embodiment of a sub-system for the recovery of block parameters.

A more detailed block diagram of one embodiment of the Qbit and Motion Flag recovery circuit is shown in FIG. 2. In this embodiment, candidate decoding and error measure circuit 205 determines possible hypotheses, i.e., values of Qbit and/or MF, and generates candidate decodings of Q codes based upon each of the hypotheses. Alternately, the hypothesis can be evaluated in the encoded domain, eliminating the need for decoding the data for all hypotheses.

An error measure is generated for each hypothesis. In one embodiment, an error measure may be determined based upon how well the candidate decoding fits into with other decoded data. For example, the measure may show how well correlated the candidate decoding is with other decoded data. Linear error, square error and Laplacian measurements may also be used.

One measure that can be used is square error measurements on decoded data. In one embodiment, the decoded domain square error measurement can be obtained using the following formula:

$$SquareError(HypNo) = \sum_i \sum_{j \in R(i)} [y'_i - y_j]^2$$

where $y'_i$ represents the i-th decoded pixel value of the block being recovered for the hypothesis HypNo. and $y_j$ represents one of the neighboring decoded pixel values of the i-th pixel, R(i) represents a set of neighboring pixels to the i-th pixel and $$y'_i = MIN + \frac{DR(q_i + 0.5)}{2^Q}$$

where DR is the recovered dynamic range value, $q_i$ is the i-th Q code and Q is the Qbit number corresponding to the hypothesis HypNo.

In one embodiment, the data in the encoded domain is evaluated with respect to each hypothesis to generate corresponding error measures. For example, a linear error measure may be determined from encoded data as follows:

$$LinearError(HypNo) = \sum_i \sum_{j \in R(i)} |a1_i - a2_j|$$

$$a1_i = adj(q1_i)$$

$$adj(q1_i) = 2^{5-Q1} q1_i + 2^{4-Q1}$$

$$a2_j = adj(q2_j)$$

$$adj(q2_j) = 2^{5-Q2} q2_j + 2^{4-Q2} + \text{Offset}$$

$$\text{Offset} = \frac{1}{N} \sum_i \sum_{j \in R(i)} (q1_i - q2_j)$$

where $q1_i$ represents the Q code of the i-th pixel of the block being recovered (block 1), $q2_j$ represents the Q code of a neighboring pixel of the i-th pixel of a neighboring block (block 2), N is the number of neighboring-pair relations, Q1 and Q2 respectively represent the hypothesized Qbit number of the block being recovered and the Qbit number of the neighboring block. R(i) represents the neighboring pixels with respect to the i-th pixel of the block being recovered, and a1$i$ and a2$j$ represent a rescaled value of a2$j$. The function adj( ) as defined above performs a Q code resealing process to normalize the values for more accurate measurements.

Figure 3:
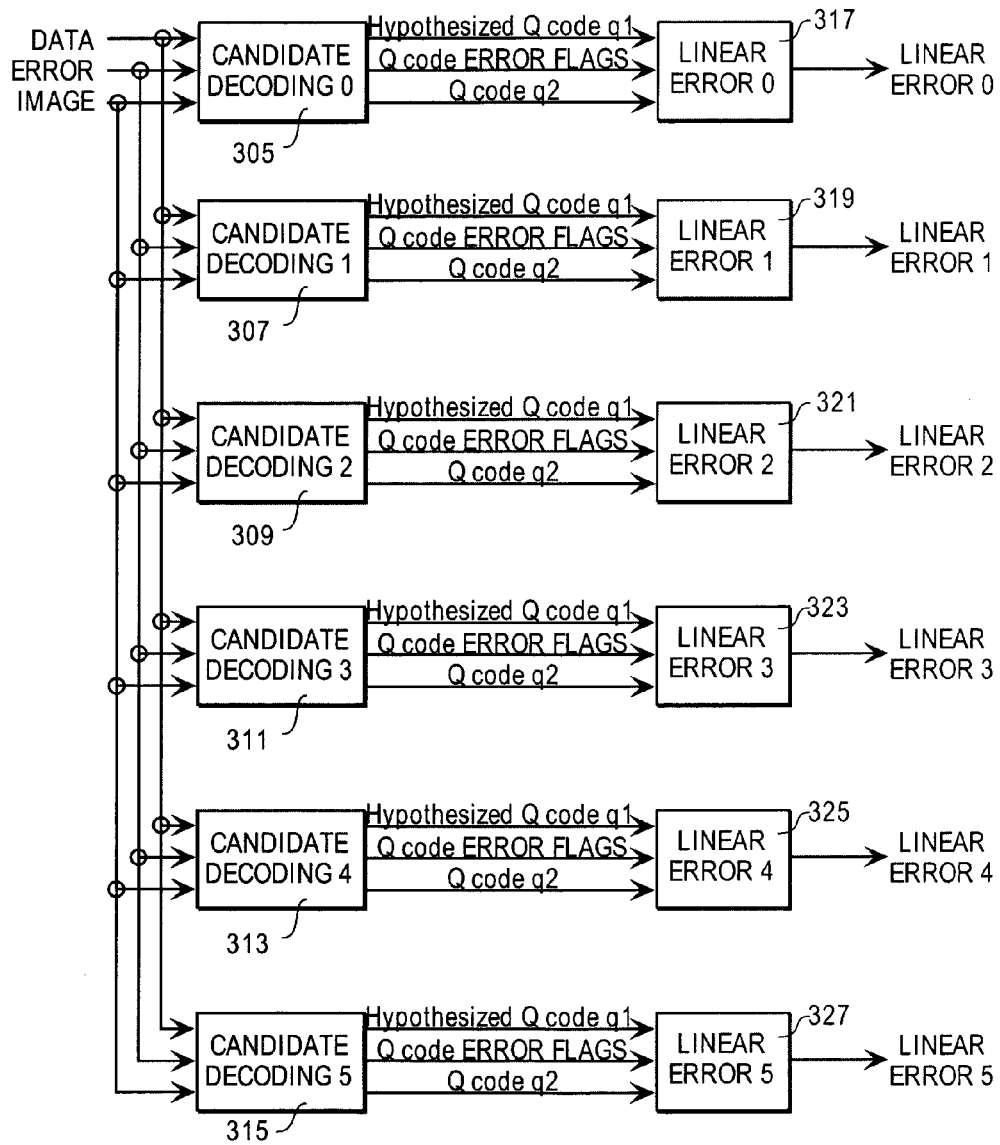
FIG. 3 is a block diagram illustration of one embodiment of a sub-system for determining a measure for different hypotheses.

FIG. 3 illustrates one embodiment of a circuit which implements the encoded domain linear error measure. Candidate decodings 305, 307, 309, 311, 313, 315 are performed based upon the different hypothesis, e.g., hypotheses 0–5. For each hypothesis, the hypothesized Q code for the block to be recovered (q1), the Q code for a neighboring block (q2) and Q code error flags determined for the particular hypothesis are input to a linear error measurement circuit 317, 319, 321, 323, 325, 327 to generate the linear error measure, Linear Error 0–5. The measure may be determined in accordance with the equations described above.

Referring back to FIG. 2, the error measures are input to scoring circuit 210 which determines which hypothesis generates the best score. A variety of techniques can be used to determine the best score. For example, confidence weighted scoring, majority based scoring, simple accumulation based scoring and majority decision scoring can be used. In one embodiment the score is determined as follows:

$$\text{score}(i) = \sum_j G\left(\frac{m(i, j) - \min(j)}{m(i, j) + \min(j)}\right)$$

where m(i, j) represents the j-th measurement for hypothesis i for the block or block group (e.g., 3 blocks which form a group), min(j) is the minimum of the j-th measurement among different hypotheses, and G is an identity function or a monotonically increasing function, depending on the application. G may be selected to be a function that increases the sensitivity of the scoring such that incorrect hypotheses will be clearly distinguishable from the correct hypothesis. For example, a square or linear function may be used. Alternately, G may be a constant, including one having a value of unity.

Alternately, if an accumulation function of, for example, linear error measures, is performed to produce a score, the score would be determined as follows:

$$\text{score}(i) = \sum_j m(i, j)$$

In this example if the measure is linear error, the hypothesis with the lowest score is determined as the best score. However, it should be realized that the optimal choice can depend on the type of measure, application and compression algorithm used.

Figure 4:
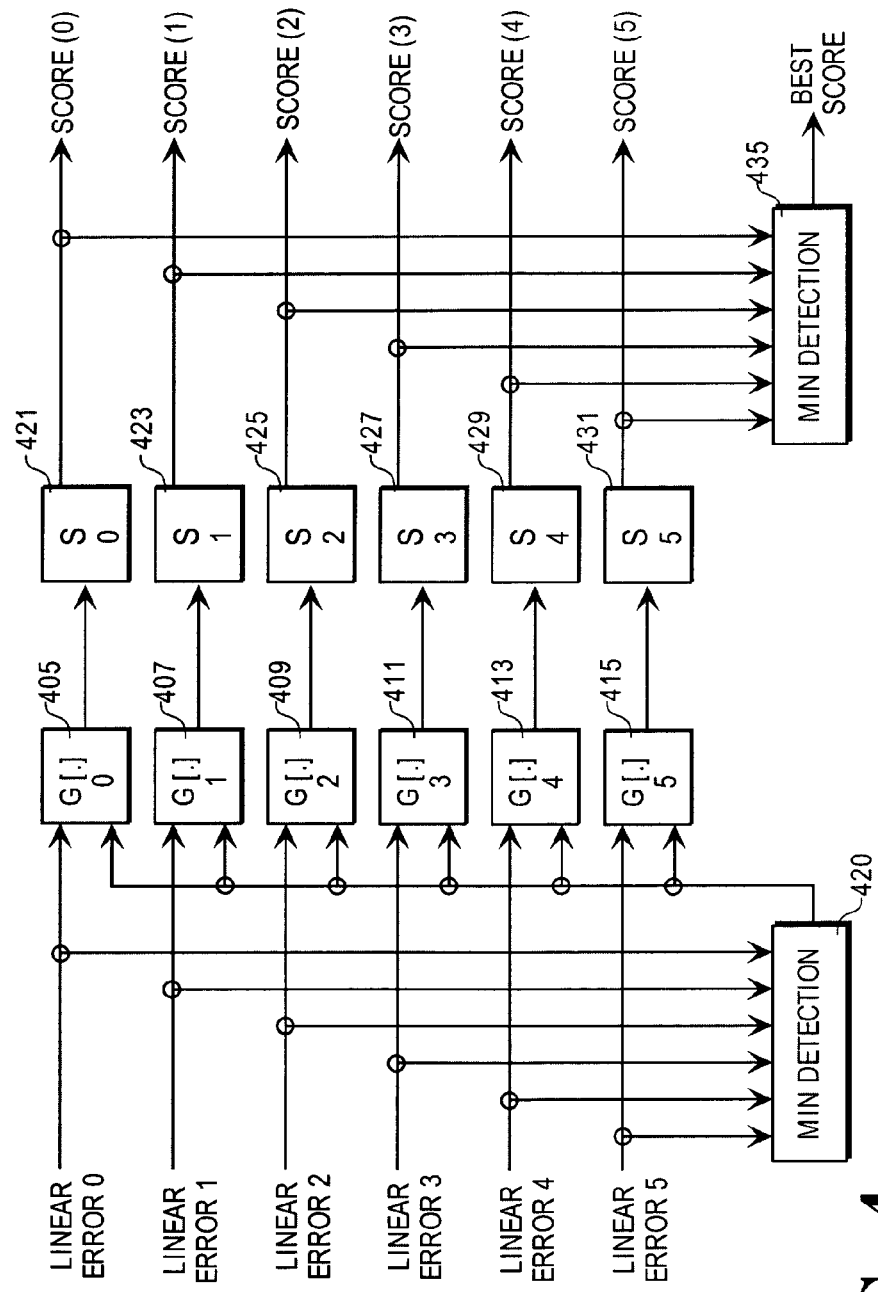
FIG. 4 is a block diagram illustration of one embodiment of a sub-system for scoring the different hypotheses.

FIG. 4 illustrates one embodiment of a circuit to determine the best score. In this embodiment, the error measures, e.g., linear error 0–5 are respectively input to function G0 to G5 405, 407, 409, 411, 413, 415. The minimum score as detected by circuit 420 can also be input to functions G0 to G5 and the values output are summed by adder logic 421, 423, 425, 427, 429, 431 to produce scores Score(0) to Score(5). In this embodiment, the minimum value determined by minimum circuit 435 is identified as the best score.

Referring back to FIG. 2, the best score is input to selectors 215 and 220 which respectively output decoded data of the selected hypotheses corresponding to the best score (to memory 225) and error flags identified with particular portions of the decoded data decoded according to the selected hypothesis.

Figure 5:
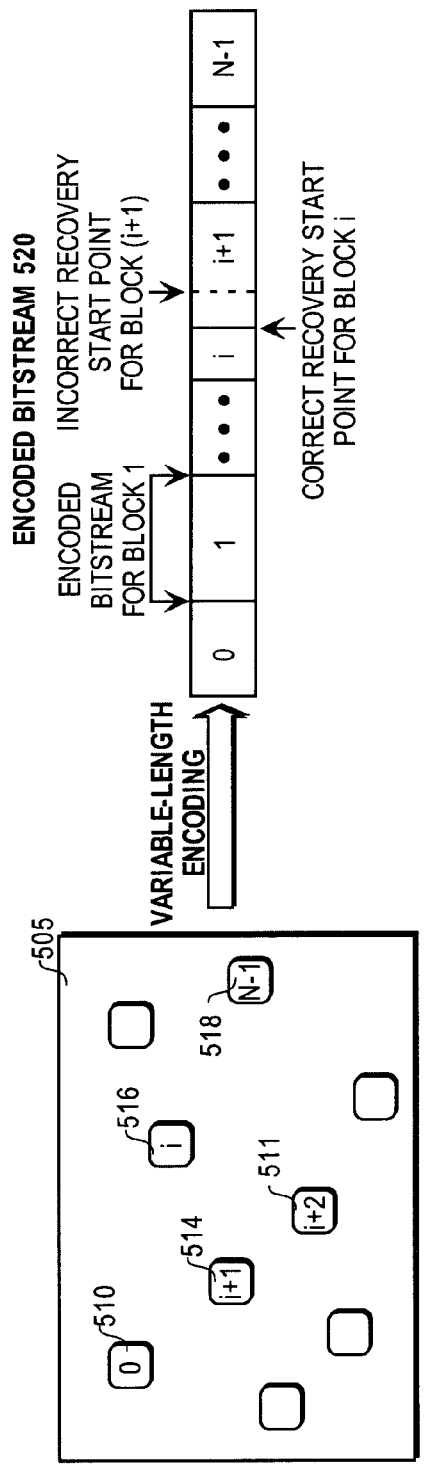
FIG. 5 illustrates an example of the effect of error propagation on score distribution.
Figure 5:
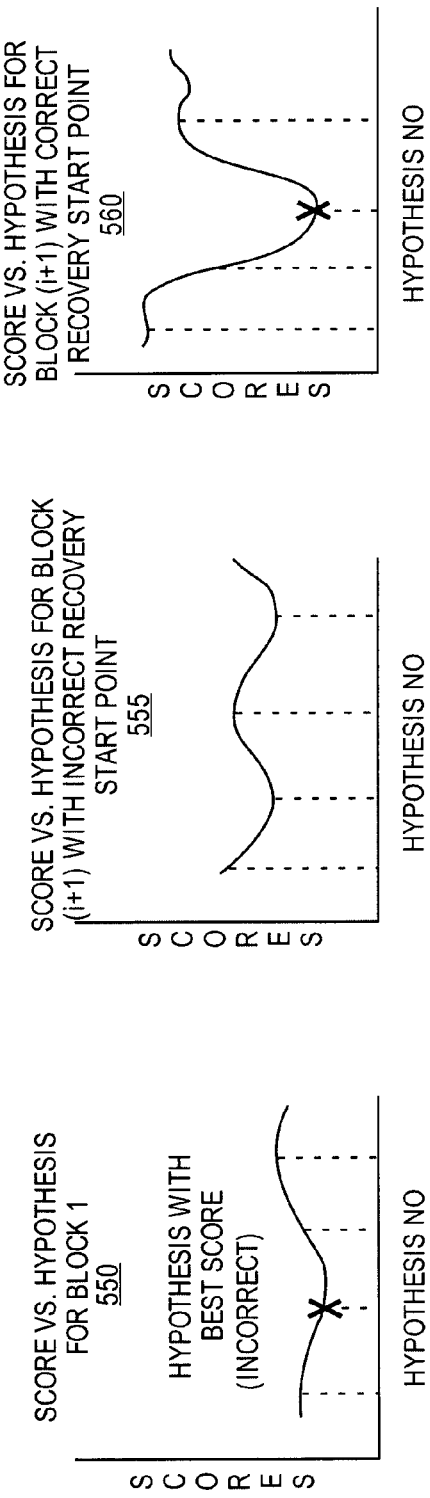

As noted earlier, if the hypothesis chosen is not correct, subsequent blocks of data will also be incorrectly decoded. This is illustrated with respect to FIG. 5. Representation 505 illustrates an example of encoding blocks in signal space. For example, representation 505 may be a representation of an image frame which contains blocks of data.

In one embodiment, image 505 shows a plurality of pixels, e.g., 510, 511, 514, 516, 518 which are encoded to produce an encoded bitstream 520. If, for example, block i is incorrectly decoded such that the length of the Q codes is not accurate, the error will propagate to subsequent blocks, e.g., blocks i+1, i+2, etc., as the starting points of the subsequent blocks are not correctly identified. As an illustration, bitstream 520 illustrates the correct start point 550 for block i and incorrect start point 555 for block i+1.

Figure 6:
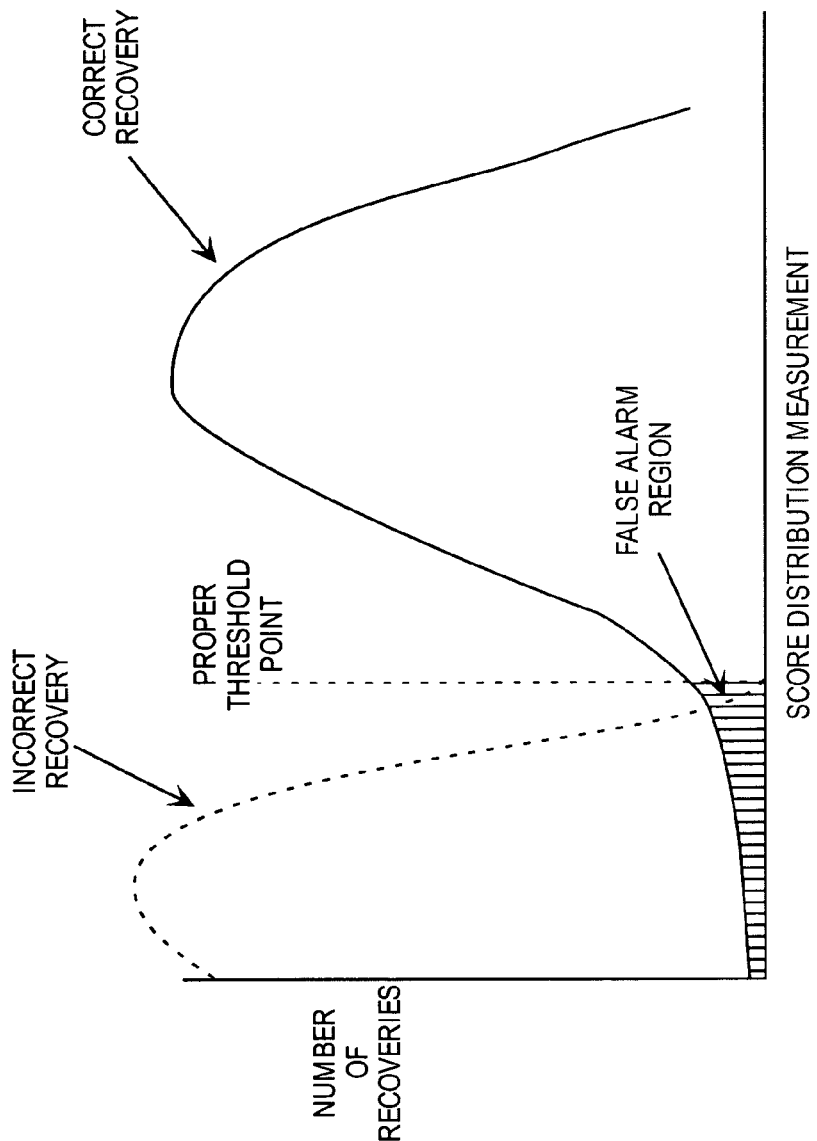
FIG. 6 shows exemplary histograms of score distribution for recovery of block parameters.

Whenever the selected hypothesis is wrong, scores are very similar among hypotheses. The threshold point can be selected such that all incorrect recovery results are surely detected. Typically, such a threshold also results in a few false alarms, i.e., some correct recovery results are detected as incorrect (shown as the shaded area in FIG. 6), and a subsequent error recovery process such as the pixel recovery process below, is used to recover the corresponding pixels. FIG. 6 further illustrates a proper threshold selection.

The thresholds can be empirically determined for a particular application using known data. For example, for 4 bit ADRC encoding, the threshold may be set to approximately a value of 120.

In one embodiment, score distributions in successive recoveries are used to reinforce the error detection decision. Given that the current hypothesis is correct, the recovery start point of a next block or group of blocks in the bitstream is also correct. If the start point is correct, hypotheses for subsequent blocks or groups of blocks will generate pixels that exhibit highly correlated properties with respect to neighboring blocks resulting in large score distributions. If the start point is incorrect, hypotheses for subsequent blocks or group of blocks will generate pixels that are uncorrelated with the neighboring pixels resulting in uncorrelated score distributions.

The score distributions previously computed can therefore be used to flag propagation errors. For example, referring to FIG. 5, score distribution 550 illustrates the selection of an incorrect hypothesis. As noted above, if an incorrect hypothesis is chosen, the starting points for subsequent blocks may not be correct. Score distributions for subsequent blocks can be used to determine error propagation. For example, score distribution 555 shows the score distribution for block i+1 when the starting point is incorrect and score distribution 560 shows the score distribution for block i+1 when the starting point is correct.

The likelihood that the hypothesis with the best score is correct may be indicated by the score distribution sd(i) among hypotheses. The score distribution can be measured in terms of statistics of various order, including standard deviation, average, median, difference of best score and second best score, difference of best score and average of best scores, etc. A score distribution may be chosen so that the score distribution curve for the correct recovery is completely non-overlapping with the score distribution curve for incorrect recovery.

A measurement criterion can be chosen that is highly sensitive to scoring variation among hypothesis. The optimal choice depends on the measurement and scoring techniques used in conjunction with the parameter, i.e., Qbit and Motion Flag, recovery technique as well as the type of data, for example, audio or video.

For example, if linear error measurements are used in conjunction with simple accumulation based scoring of the linear error measurements, the difference between the best and second best linear error scores may be used as a metric for score distribution. Thus, continuing with the present example, the score distribution for the i-th block or group can be measured as sd(i)=score(second best)−score(best), where score(best) represents the score for the contemplated best hypothesis, and score(second best) represents the score for the contemplated second best hypothesis.

The likelihood that a chosen hypothesis is correct may also be determined based on a compatibility measurement. One embodiment of this concept may utilize the decoded domain square error measurement. Pixels belonging to a localized block are highly correlated with neighboring pixels, and as a result, the square error measurement may yield a low value, although in general, the higher the dynamic range, the higher the square error. However, for a given dynamic range, an incorrect hypothesis results in a much higher square error measurement than that resulting from a correct hypothesis. Thus, the ratio of square error measurement and dynamic range can be alternatively used in place of the score distribution measurement sd.

As noted earlier, the error detection process based on score distribution measurements sd(i) for a block or group i can be reinforced by combining the score distribution measurements of the successive blocks in the bitstream, e.g., i+1, i+2 . . . i+W. where W is a length of what is referred to herein as reinforcement window. In one embodiment when groups of 3 blocks are processed together, W may be equal to 2. Other values of W may be selected depending upon the application and performance desired.

Figure 7:
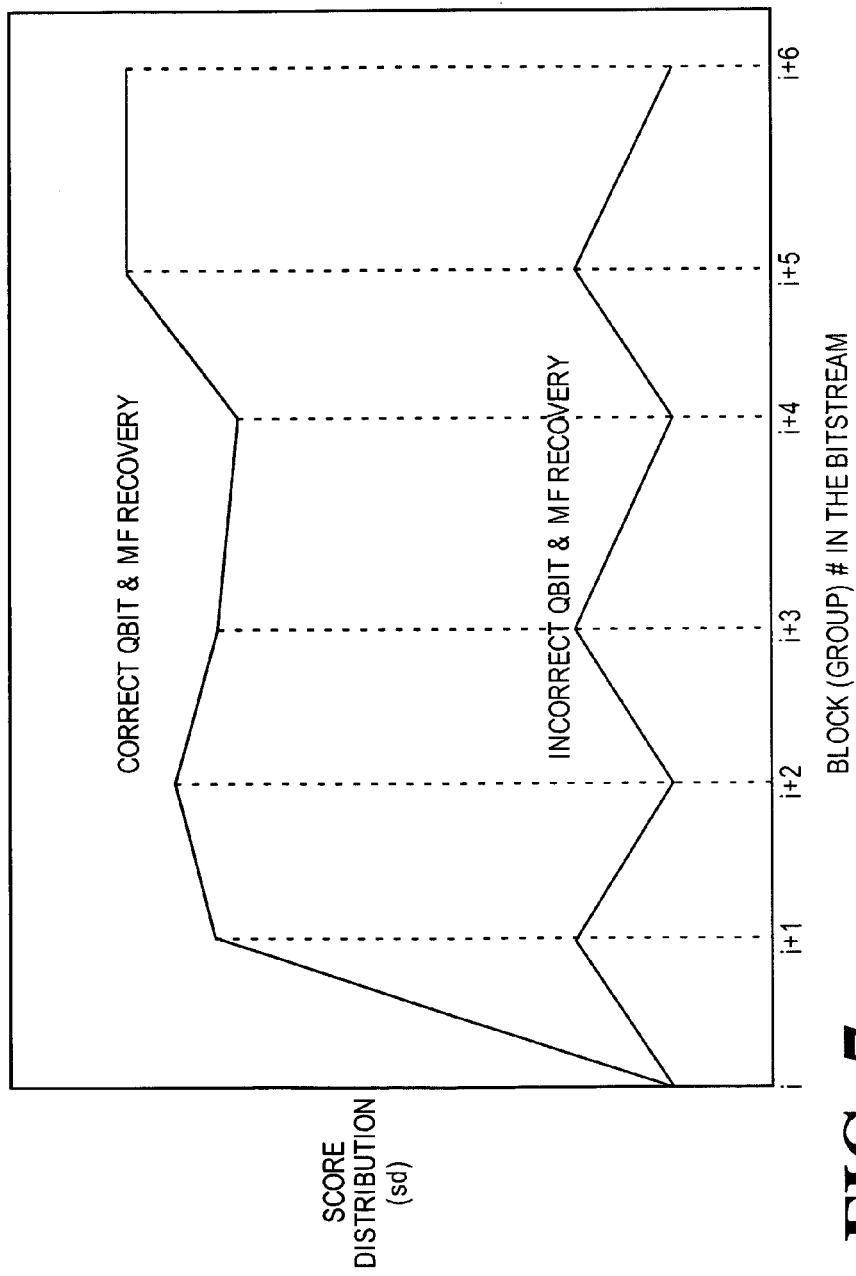
FIG. 7 illustrates an example of successive score distribution following Qbit and Motion Flag recovery.

FIG. 7 shows a typical score distribution sd of successive blocks or groups (referred to herein collectively as block units) following recovery for the i-th block unit. If the current recovery result for block i is incorrect, recovery start points of all successive blocks (i+1 . . . i+W) within the reinforcement window W becomes incorrect and as a consequence, the corresponding score distribution measurements are small. If the current recovery result is correct, score distribution measurements of successive block units are large. Therefore, score distributions or successive units within a predetermined reinforcement window can be combined to generate an integrated robust measurement for error propagation detection.

Several schemes can be employed for combining successive score distribution measurements, including empirically weighted averaging within the reinforcement window, or simple addition of score distribution measurements within the window.

For example, if the combined score for unit i is:

$$\text{comb\_sd}(i) = \sum_{j=0}^{W} sd(i+j) \leq \text{comb\_thr},$$

the recovery result is detected as an incorrect one if the current score sd(i) is less than or equal to a threshold value ind-thr and comb_thr is a preset threshold value for multiple block units within the reinforcement window.

As noted earlier, the threshold values may be empirically determined. For example, the individual threshold may be a value of approximately 120, and the combined threshold may be a value of approximately 800 when W=2.

Alternately, a majority decision can be employed. For example, if:

$$\text{comb\_sd}(i) = \sum_{j=0}^{W} \min(1, \max(0, sd(i+j) - \tau(j)))$$

is less than W/2, the recovery result is marked as an incorrect one. $\tau(j)$ is a constant or variable threshold within the reinforcement window. In one embodiment, $\tau(j)$ is a predetermined constant that increases in value according to the block number in the block sequence being examined. For example, for 3-block units, $\tau(0)$ may be approximately equal to 120, $\tau(1)$ may be approximately equal to 200 and $\tau(2)$ may be approximately equal to 300.

Other methods of combining the information of a plurality of blocks or groups of blocks can also be used.

Figure 8:
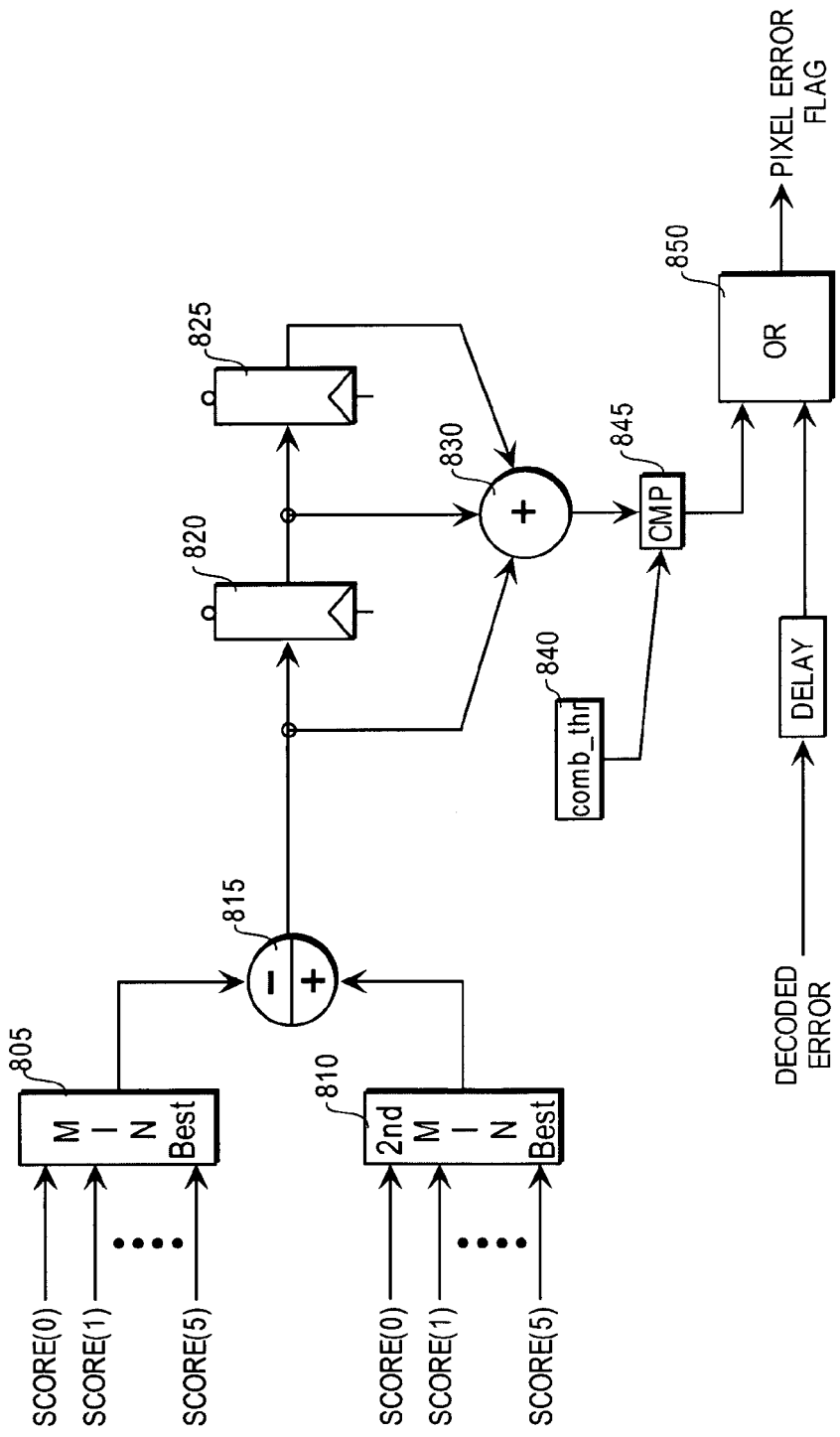
FIG. 8 is a block diagram illustration of one embodiment of a sub-system for detection of error propagation.

FIG. 8 is one embodiment of a circuit for error propagation estimation. The scores for a particular block are evaluated to determine the best and second best score. This is determined by circuits 805 and 810. The difference between the best and second best score is determined by element 815. The scores are then temporarily stored in registers 820, 825, so as to accumulate scores in the present embodiment for a group of three blocks within a reinforcement window of length 3. The difference values are then summed to perform by adder 830 to produce a combined value which is compared to the combined threshold 840 by comparator 845. If the threshold is not exceeded, an error flag is raised which is then combined by OR gate logic 850 with other error flags which may have been previously determined to generate the pixel error flags that indicate that a pixel recovery process is required for these particular pixels.

Figure 9:
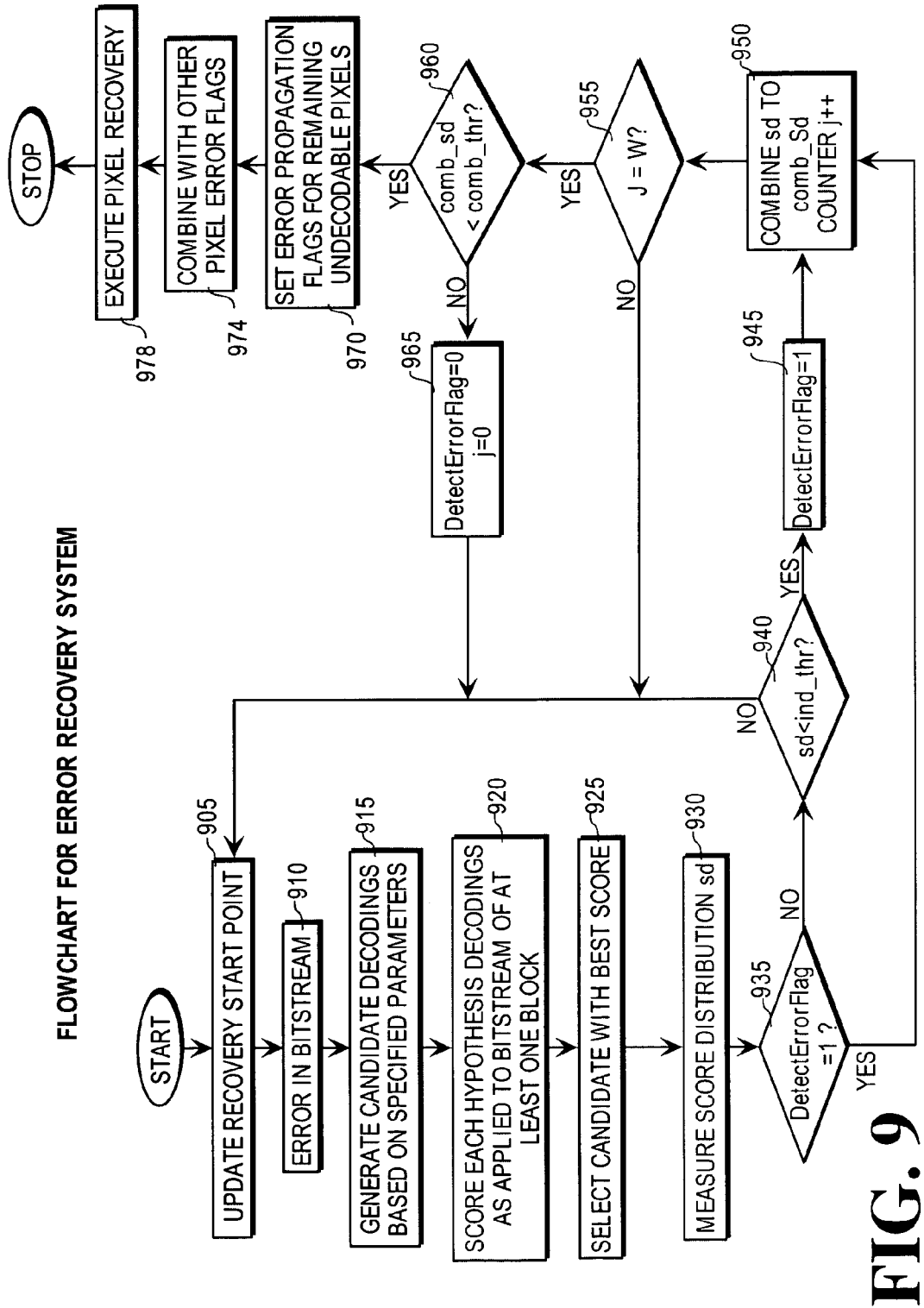
FIG. 9 is a flow diagram illustrating one embodiment of a process for recovering lost or damaged data.

FIG. 9 illustrates one embodiment of a process for recovering data, and in particular for detecting error propagation in a bitstream of data. At step 905 the start point of a block or group of blocks is identified. If an error is found in the bitstream corresponding to that start point (step 910), a recovery process is initiated to provide candidate decodings at step 915. For example, in one embodiment candidate decodings of Motion Flag and Qbit data may be generated based upon specified parameters. At step 920, each hypothesis is scored and the candidate with the best score is selected, step 925. The score distribution sd, is measured at step 930.

At step 935, if the error flag, DetectErrorFlag, is set, then the score distribution is combined with a prior combined score distribution variable comb_sd, and a counter (j) is incremented, step 950. Thus the combined score distribution comb sd is generated for a predetermined number of blocks within the reinforcement window W.

The combined score distribution value is then compared to a combined threshold value comb_thr to determine whether subsequent blocks require pixel recovery as the error in a previous block has caused error propagation to occur in the subsequent blocks. At step 940, if an individual score distribution is within a range defined by the threshold value, e.g., does not exceed the individual threshold value, the error flag is set, step 945. Further, a sum of subsequent score distributions is generated and a counter maintained to sum up the score distributions for W blocks or groups of blocks within the reinforcement window, step 955.

Once the combined score distribution has been generated for the number of blocks within the reinforcement window, at step 960, the combined score distribution is compared to the combined threshold value comb_thr. If a combined score distribution is not within the range defined by the threshold value, e.g., exceeds or equals the combined threshold value, the error flag and counter are reset and the next block is examined, steps 965, 905. This is indicative of the fact that error propagation did not occur and pixel recovery is not required for those blocks. However, if the combined score distribution is within the range, e.g., less than the combined threshold, step 960, error propagation flags are set for remaining undecoded pixels, step 970. The error propagation flags are optionally combined with other error flags, step 974, and pixel error recovery processing is performed on the error flagged pixels, step 978.

Figure 10:
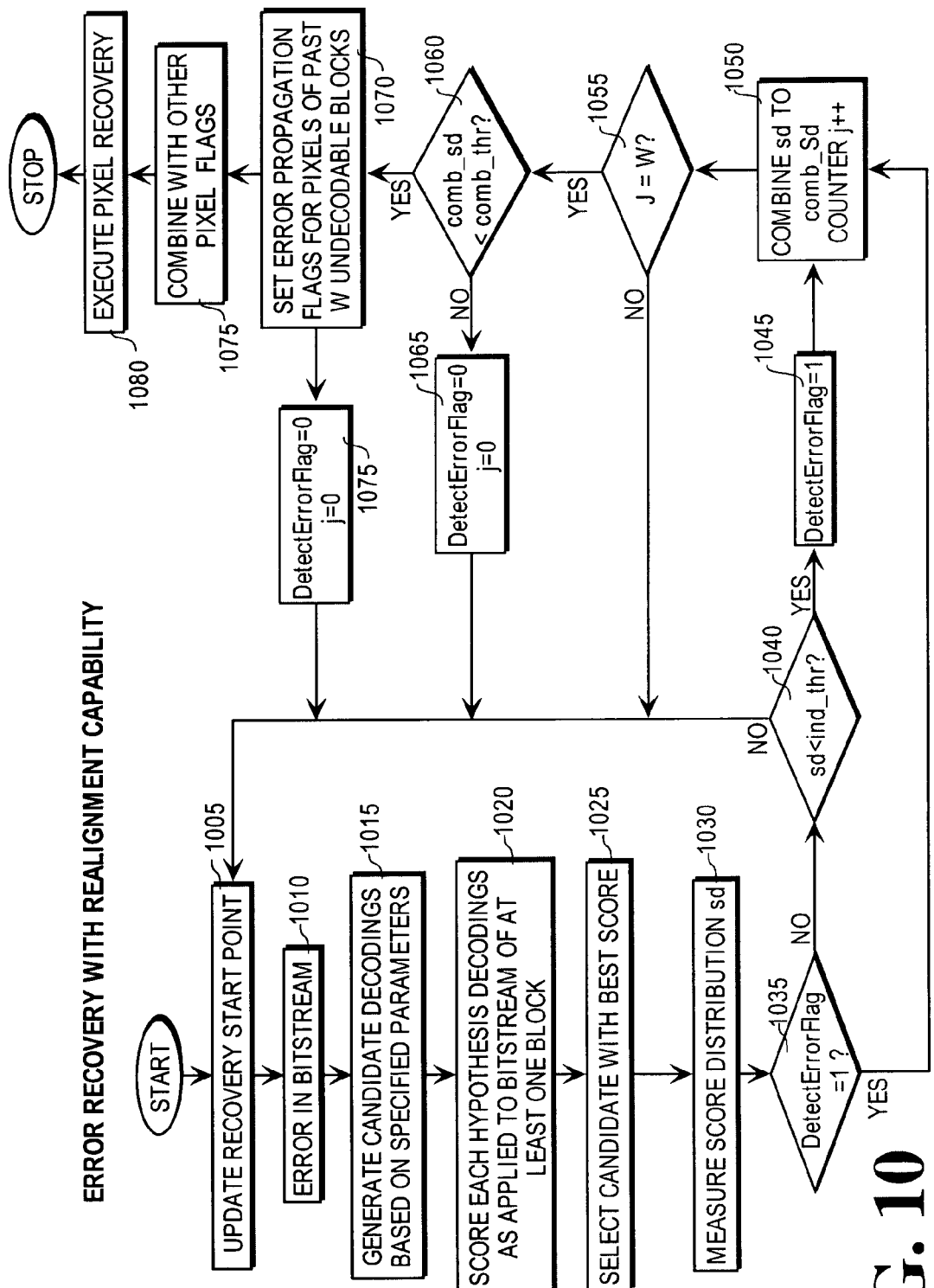
FIG. 10 is a flow diagram illustrating an alternate embodiment of a process for recovering lost or damaged data.

One embodiment of the process is illustrated in FIG. 10. FIG. 10 performs steps 1005, 1010, 1015, 1020, 1025, 1030, 1035, 1040, 1045, 1050, 1055, 1060, 1065, that are similar to those steps discussed above with respect to FIG. 9. In addition, the process as set forth in FIG. 10 marks the past W blocks for pixel recovery if the combined score distribution is within the range defined by the combined threshold value, step 1070. If there are more blocks to process, the error flag and the counter are reset and the next block examined, step 1075 and 1005. Pursuant to steps 1075 and 1080, pixel error recovery is performed on those pixels with associated error flags set, step 1075, is optional. Thus, in one embodiment a pixel recovery process is performed on pixel errors flagged due to error propagation.

The embodiment set forth in FIG. 10 allows for those instances where the start points may naturally realign even though earlier blocks contained erroneous start points. Thus, pixel recovery will only be applied to those blocks or groups of blocks that have been examined and determined in the range defined by the threshold.

As noted above, once the error flags are set, whether due to error propagation or earlier error detection, a pixel recovery process is performed (e.g., steps 978 FIG. 9, step 1080 FIG. 10). In one embodiment, neighboring blocks are used to recover pixels or pixel data contained in erroneous blocks. For example, classified adaptive error recovery processing can be used to generate the pixels using available neighboring pixels. This is disclosed in U.S. Pat. No. 5,469,216, which is incorporated herein by reference. Alternately, a classified adaptive error recovery process such as is explained below may be used.

Classification with respect to a deteriorated input signal, e.g., a signal containing lost/damaged data, is performed according to the input signal characteristics. The correct adaptive filter is prepared for each class prior to error recovery processing. More than one classification method may optionally be used to create the plurality of classes. Created classes may include a motion class, an error class, a spatial activity class, or a spatial class.

Classified adaptive error recovery is the technology which utilizes classified adaptive filter processing. A correct classification with respect to the deteriorated input signal is performed according to the input signal characteristics. An adaptive filter is prepared for each class prior to error recovery processing. A plurality of classes is generated based upon characteristics of the data points. The data points are classified as belonging to one of the plurality of classes and assigned a corresponding signal class. An undeteriorated signal is output corresponding to the input signal in accordance with the input signal class ID. Block data may be generated from the plurality of data points.

Figure 11:
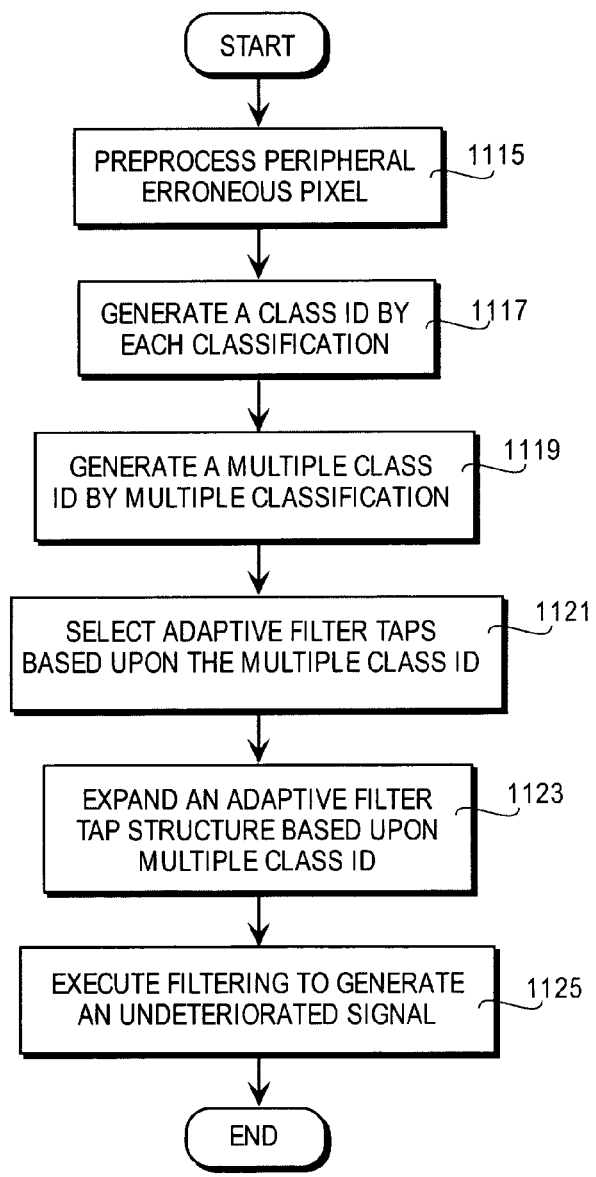
FIG. 11 is a flow chart illustrating one embodiment of a pixel error recovery process.

A flow diagram of an embodiment is shown in FIG. 11. The flow chart of FIG. 11 shows the basic processing stream for generating an undeteriorated signal, i.e., a recovered signal, from the deteriorated input signal which contains lost/damaged data. At step 1115, the preprocessing for peripheral erroneous pixels is performed. For example, an erroneous pixel may be replaced with horizontal neighboring data when there are no horizontal errors. If horizontal errors exist, the erroneous pixel may be replaced with vertical neighboring data. If vertical errors also exist, the erroneous pixel may be replaced with previous frame data.

At step 1117, each classification regarding the deteriorated input signal is executed to generate a class ID. Some class taps are selected adaptively according to another class ID. Multiple classifications may be executed, such as motion classification, error classification, spatial activity classification and spatial classification.

The classification scheme can be defined during system design, where the classification scheme, the number of classes, and other specification are decided for the target data. The design stage may include, among others, considerations of system performance and hardware complexity.

At step 1119, multiple classification generates a multiple class ID with a plurality of class IDs which are generated by various classification at step 1117. At step 1121, filter taps are adaptively selected according to the multiple class ID which is generated at step 1119. At step 1123, the filter tap structure is adaptively expanded according to the multiple class ID which is generated at step 1119. The number of filter coefficients that may be stored can be reduced by allocating the same coefficient to multiple taps. This process is referred to as filter expansion. At step 1125, filtering with respect to the deteriorated input signal is executed to generate an undeteriorated signal. Filter coefficients are selected adaptively according to the multiple class ID which is generated in step 1119.

For further information regarding classified adaptive error recovery, see U.S. patent application Ser. No. 6,307,979 titled "Classified Adaptive Error Recovery Method and Apparatus", filed concurrently herewith, and is herewith incorporated by reference.

Although the present invention is discussed with respect to image data, the present invention may be used with any form of correlated data, including without limitation photographs or other two-dimensional static images, holograms, or other three-dimensional static images, video or other two-dimensional moving images, three-dimensional moving images, a monaural sound stream, or sound separated into a number of spatially related streams, such as stereo.

Figure 12:
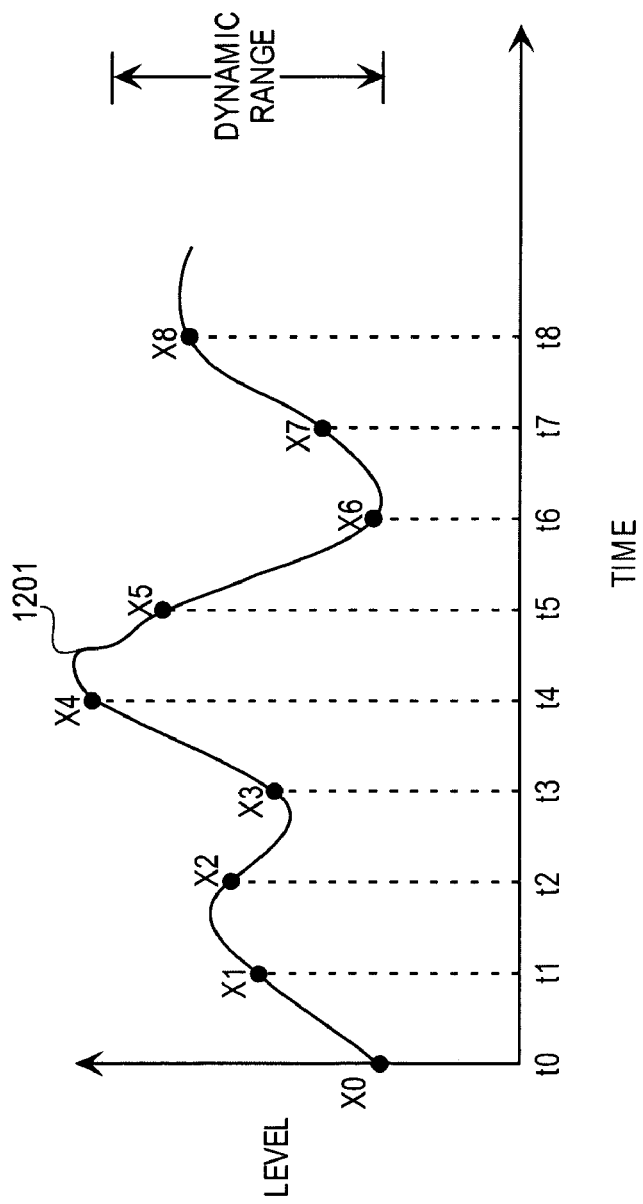
FIG. 12 illustrates parameters of an audio signal.

FIG. 12 shows an example of an audio signal and how it is compatible with the present invention.

An example of audio signal 1201 is monitored at one or more time points t0–t8. The level of audio signal 1201 at time points t0–t8 is given by tap points X0–X8. The dynamic range of the audio signal 1201 is given as the difference between the lowest level tap point X0 and the highest level tap point X4. In addition to dynamic range, the standard deviation, the Laplacian value or the spatial gradient value can be introduced for spatial activity classification.

The invention has been described in conjunction with the preferred embodiment. It is evident that numerous alternatives, modifications, variations and uses will be apparent to those skilled in the art in light of the foregoing description.

What is claimed is:

1. A method for recovery of lost/damaged data comprising:
   generating hypotheses for lost/damaged data within a received bitstream of encoded image data, wherein each hypothesis specifies a decoding for the lost/damaged data;
   generating scores for the hypotheses;
   selecting a hypothesis corresponding to a best score from the generated scores;
   decoding only the lost/damaged data according to the selected hypothesis;
   evaluating at least one other hypothesis and selectively flagging data based upon the evaluation; and
   executing an error recovery process on the flagged data.

2. The method as set forth in claim 1, wherein the evaluating comprises examining at least one score distribution of at least one hypothesis.

3. The method as set forth in claim 2, wherein the evaluating comprises comparing the score distribution to a threshold.

4. The method as set forth in claim 2, wherein data of the received bitstream of encoded image data is divided into a plurality of block units of varying length, wherein the hypotheses indicate the endpoint of at least one block unit, and the evaluating is performed across at least a portion of the plurality of block units.

5. The method as set forth in claim 2, wherein the score distribution is determined according to a difference function between values derived from the scores of the hypotheses.

6. The method as set forth in claim 2, wherein the score distribution is determined according to the difference between a best score of scores of the hypotheses and a second best score of the scores of the hypotheses.

7. The method as set forth in claim 4, wherein data is flagged for the plurality of blocks.

8. The method as set forth in claim 4, wherein a block unit is selected from the group consisting of a block or group of blocks.

9. The method as set forth in claim 4, wherein the block unit is of varying lengths.

10. The method as set forth in claim 1, wherein:
    the received data is divided into a plurality of block units;
    the selected hypothesis indicating the endpoint of at least one block unit; and
    the evaluating comprising evaluating combined hypotheses for at least a portion of the plurality of block units.

11. The method as set forth in claim 10, wherein the evaluating comprises generating a combined score distribution.

12. The method as set forth in claim 11, wherein the evaluating comprises comparing the combined score distribution to a combined threshold.

13. The method as set forth in claim 12, wherein the encoded image data is divided into a plurality of blocks and the error recovery process comprises a pixel error recovery process that uses neighboring block information to recover pixel data of flagged data.

14. The method as set forth in claim 1, wherein the bitstream further comprises data selected from the group consisting of correlated data and audio data.

15. The method as set forth in claim 1, wherein the error recovery process comprises a pixel error recovery method.

16. An apparatus for recovery of lost/damaged data comprising:
    a data recovery circuit configured to generate hypotheses for lost/damaged data within a received bitstream of encoded image data, wherein each hypothesis specifies a decoding for the lost/damaged data, generate scores for the hypotheses, select a hypotheses corresponding to a best score from the generated scores and decode only the lost/damaged data according to the selected hypothesis;
    an error propagation detection circuit coupled to the data recovery circuit, the error propagation circuit configured to selectively flag data based upon an evaluation of the hypotheses; and
    an error recovery circuit coupled to the data recovery circuit and the error propagation detection circuit, the error recovery circuit configured to execute error recovery on the flagged data.

17. The apparatus as set forth in claim 16, wherein the error propagation circuit performs an evaluation by examining at least one score distribution corresponding to the hypotheses.

18. The apparatus as set forth in claim 17, wherein the error propagation circuit performs an evaluation by comparing the score distribution to a threshold.

19. The apparatus as set forth in claim 17, wherein received data is divided into a plurality of block units, the hypotheses indicating the endpoint of at least one block unit, the score distribution assembled across at least a portion of the plurality of block units.

20. The apparatus as set forth in claim 17, wherein the score distribution is determined according to the difference between a best score of scores of the hypotheses and a second best score of the scores of hypotheses.

21. The apparatus as set forth in claim 19, wherein the error propagation detection circuit flags the data in the plurality of blocks for which an error recovery method is required.

22. The apparatus as set forth in claim 19, wherein a block unit is selected from the group consisting of a block or group of blocks.

23. The apparatus as set forth in claim 19, wherein the received data is divided into a plurality of block units, the selected hypothesis indicating the endpoint of at least one block unit and the evaluation comprising an evaluation of combined hypotheses for at least a portion of the plurality of block units.

24. The apparatus as set forth in claim 23, wherein the evaluation comprises a combined score distribution using score distributions corresponding to at least a portion of the plurality of block units.

25. The apparatus as set forth in claim 24, wherein the evaluation further comprises a comparison of the combined score distribution to a combined threshold.

26. The apparatus as set forth in claim 16, wherein the error recovery method comprises a pixel error recovery method.

27. The apparatus as set forth in claim 16, wherein encoded image data is divided into blocks and the error recovery method comprises a pixel error recovery method that uses neighboring block information to recover pixel data of flagged data.

28. The apparatus as set forth in claim 16, wherein the bitstream further comprises data selected from the group consisting of correlated data and audio data.

29. The apparatus as set forth in claim 16, wherein the data recovery circuit and error propagation detection circuit comprises circuitry selected from the group consisting of logic circuits and a processor.

30. A computer readable medium comprising instructions, which when executed in a processing system, cause the system to perform data recovery of lost/damaged data, comprising:

generating hypotheses for lost/damaged data within a received bitstream of encoded image data, wherein each hypothesis specifies a decoding for the lost/damaged data;

generating scores for the hypotheses;

selecting a hypothesis corresponding to a best score from the generated scores;

decoding only the lost/damaged data according to the selected hypothesis;

evaluating the hypotheses and selectively flagging data based upon the evaluation; and executing an error recovery process on the flagged data.

31. The computer readable medium as set forth in claim 30, wherein evaluating comprises examining at least one score distribution of at least one hypothesis.

32. The computer readable medium as set forth in claim 31, wherein evaluating comprises comparing the score distribution to a threshold.

33. The computer readable medium as set forth in claim 30, wherein the data of the received bitstream of data is divided into a plurality of block units of varying length, the hypotheses indicate the endpoint of at least one block unit, and the evaluating is performed across at least a portion of the plurality of block units.

34. The computer readable medium as set forth in claim 33, wherein data is flagged for the plurality of blocks.

35. The computer readable medium as set forth in claim 33, wherein a block unit is selected from the group consisting of a block or group of blocks.

36. The computer readable medium as set forth in claim 30, wherein:

the received data is divided into a plurality of block units;

the selected hypothesis indicating the endpoint of at least one block unit; and the evaluating comprising evaluating combined hypotheses for at least a portion of the plurality of block units.

37. The computer readable medium as set forth in claim 36, wherein the evaluating comprises generating a combined score distribution.

38. The computer readable medium as set forth in claim 37, wherein the evaluating comprises comparing the combined score distribution to a combined threshold.

39. The computer readable medium as set forth in claim 30, wherein the bitstream further comprises data selected from the group consisting of correlated data and audio data.

40. An apparatus for recovery of lost/damaged data comprising:

means for generating hypotheses for lost/damaged data within a received bitstream of encoded image data, wherein each hypothesis specifies a decoding for the lost/damaged data;

means for generating scores for the hypotheses;

means for selecting a hypothesis corresponding to a best score from the generated scores;

means for decoding only the lost/damaged data according to the selected hypothesis;

means for evaluating the hypotheses and selectively flagging data based upon the evaluation; and means for executing an error recovery process on the flagged data.

41. A method for recovery of data comprising:

generating hypotheses for lost/damaged data within a received bitstream of encoded image data, wherein each hypothesis specifies a decoding for the lost/damaged data;

assembling at least one score distribution using the hypotheses; and selectively flagging data that an error recovery method is required for based upon the score distribution.

42. The method as set forth in claim 41, wherein data of the received bitstream of encoded image data is divided into a plurality of block units of varying length, the hypotheses indicate the endpoint of at least one block unit, and the score distribution is assembled across at least a portion of the plurality of block units.

43. The method as set forth in claim 42, wherein the flagging selectively flags the data in the plurality of blocks for which an error recovery method is required.

44. The method as set forth in claim 42, wherein a block unit is selected from the group consisting of a block or group of blocks.

45. The method as set forth in claim 41, wherein the received data is divided into a plurality of block units, the hypotheses indicate the endpoint of at least one block unit, the assembling comprising if a score distribution for a block unit of the plurality of block units is within a range defined by an individual threshold, generating a combined score distribution of the score distributions for at least a portion of the plurality of block units; and the flagging comprising if the combined score distribution is within a range defined by a combined threshold, flagging that an error recovery method is required for the at least a portion of the plurality of block units.

46. The method as set forth in claim 41, wherein the score distribution is determined according to a difference function between values derived from the scores of the hypotheses.

47. The method as set forth in claim 41, wherein the score distribution is determined according to the difference between a best score of scores of the hypotheses and a second best score of the scores of hypotheses.

48. The method as set forth in claim 41, wherein the bitstream further comprises data selected from the group consisting of correlated data and audio data.

49. The method as set forth in claim 41, further comprising the performing an error recovery method for flagged data.

50. The method as set forth in claim 49, wherein the error recovery method comprises a pixel error recovery method.

51. The method as set forth in claim 49, wherein the encoded image data is divided into a plurality of blocks and the error recovery method comprises a pixel recovery method that uses neighboring block information to recover pixel data of flagged data.

52. An apparatus for recovery of data comprising:

a data recovery circuit configured to generate hypotheses for lost/damaged data within a received bitstream of encoded image data and assemble at least one score distribution using the hypotheses, wherein each hypothesis specifies a decoding for the lost/damaged data; and an error propagation detection circuit coupled to the data recovery circuit, the error propagation detection circuit configured to selectively flag data that an error recovery method is required for based upon the score distribution.

53. The apparatus as set forth in claim 52, further comprising an error recovery circuit coupled to the error propagation detection circuit, the error recovery circuit configured to generate an error recovery method for flagged data.

54. The apparatus as set forth in claim 53, wherein the error recovery method comprises a pixel error recovery method.

55. The apparatus as set forth in claim 53, wherein the encoded image data is divided into blocks and the error recovery method comprises a pixel error recovery method that uses neighboring block information to recover pixel data of flagged data.

56. The apparatus as set forth in claim 53, wherein received data is divided into a plurality of block units of varying length, the hypotheses indicating the endpoint of at least one block unit, the score distribution assembled across the plurality of block units.

57. The apparatus as set forth in claim 56, wherein the error propagation detection circuit flags the data in the plurality of blocks for which an error recovery method is required.

58. The apparatus as set forth in claim 52, wherein received data is divided into a plurality of block units, the hypotheses indicating the endpoint of at least one block unit, the error propagation detection circuit further configured to:
generate a combined score distribution of the score distributions for at least a portion of the plurality of block units if a score distribution for a block unit of the plurality of block units is within a range defined by an individual threshold; and
selectively flag that an error recovery method is required for the at least a portion of the plurality of block units if the combined score distribution is within a range defined by a combined threshold.

59. The apparatus as set forth in claim 52, wherein the score distribution is determined according to a difference function between values derived from the scores of the hypotheses.

60. The apparatus as set forth in claim 52, wherein the score distribution is determined according to the difference between a best score of scores of the hypotheses and a second best score of the scores of hypotheses.

61. The apparatus as set forth in claim 52, wherein the bitstream further comprises data selected from the group consisting of correlated data and audio data.

62. The apparatus as set forth in claim 52, wherein the data recovery circuit and error propagation detection circuit comprises circuitry selected from the group consisting of logic circuits and a processor.

63. A computer readable medium comprising instructions, which when executed in a processing system, causes the system to perform recovery of data, comprising:
generating hypotheses for lost/damaged data within received encoded image data, wherein each hypothesis specifies a decoding for the lost/damaged data;
assembling at least one score distribution using at least one other hypothesis; and
selectively flagging data that an error recovery method is required based upon the score distribution.

64. The computer readable medium as set forth in claim 63, wherein the received encoded image data is divided into a plurality of block units of varying length, the hypotheses indicating the endpoint of at least one block unit, the score distribution assembled across the plurality of block units.

65. The computer readable medium as set forth in claim 64, wherein the instruction that, when executed, flags an error recovery method for the data flags an error recovery method for the plurality of blocks.

66. The computer readable medium as set forth in claim 63, wherein the received encoded image data is divided into a plurality of block units of varying lengths, the hypotheses indicating the endpoint of at least one block unit, the instruction, which when executed assembles a score distribution, comprises if a score distribution for a block unit of the plurality of block units is within a range defined by an individual threshold, generating a combined score distribution of the score distributions for at least a portion of the plurality of block units; and the instruction, which when executed flags data, comprises if the combined score distribution is within a range defined by a combined threshold, flagging that an error recovery method is required for the at least a portion of the plurality of block units.

67. The computer readable medium as set forth in claim 63, wherein the score distribution is determined according to a difference function between values derived from the scores of the hypotheses.

68. The computer readable medium as set forth in claim 63, wherein the bitstream further comprises data selected from the group consisting of correlated data and audio data.

69. The computer readable medium as set forth in claim 63, further comprising instructions which, when executed, comprise performing an error recovery method for flagged data.

70. The computer readable medium as set forth in claim 69, wherein the error recovery method comprises a pixel error recovery method.

71. An apparatus for recovery of data comprising:
means for generating hypotheses for lost/damaged data in encoded image data, wherein each hypothesis specifies a decoding for the lost/damaged data;
means for assembling at least one score distribution using at least one hypothesis; and
means for selectively flagging that an error recovery method is required based upon the score distribution.

72. A method for recovery of data from a bitstream of encoded image data comprising:
generating hypotheses for lost/damaged data within the bitstream, wherein each hypothesis specifies a decoding for the lost/damaged data;
assembling a score distribution using the hypotheses;
detecting errors in data due to error propagation within the bitstream of encoded image data if the score distribution is within a range defined by a threshold; and
performing a data error recovery process on data with detected errors.

73. The method as set forth in claim 72, wherein the bitstream further comprises data selected from the group consisting of correlated data and audio data.

74. The method as set forth in claim 72, wherein the performing a data error recovery process on data comprises using a pixel error recovery process.

75. The method as set forth in claim 74, wherein the pixel error recovery process comprises a classified adaptive pixel error recovery process.

76. The method as set forth in claim 72, further comprising the receiving error flags indicative of errors with respect to data of the bitstream, said performing a data error recovery process further comprising performing the data error recovery process on the data corresponding to received error flags.

77. The method as set forth in claim 72, wherein the performing a data error recovery process is performed on at least one block unit of data.

78. The method as set forth in claim 72, further comprising:
  decoding at least a portion of the bitstream of encoded image data;
  preventing data degradation by performing a block unit recovery process on the decoded data in block units in which errors due to error propagation are detected, said preventing performed prior to the performing a data error recovery process.

79. An apparatus for recovery of data from a bitstream of encoded image data comprising:
  a data recovery circuit configured to generate hypotheses for lost/damaged data within a received bitstream of encoded image data, wherein each hypothesis specifies a decoding for the lost/damaged data;
  an error propagation detection circuit coupled to the data recovery circuit, said error propagation detection circuit configured to detect errors in data due to error propagation within the bitstream of data; and
  an error recovery circuit coupled to the error propagation detection circuit, the error recovery circuit configured to perform a data error recovery process on data with detected errors.

80. The apparatus as set forth in claim 79, wherein the bitstream further comprises data selected from the group consisting of correlated data and audio data.

81. The apparatus as set forth in claim 79, wherein the error propagation detection circuit generates hypotheses for lost/damaged data within the received bitstream of encoded image data, assembles a score distribution using hypotheses, and detects an error if the score distribution is within a range defined by a threshold.

82. The apparatus as set forth in claim 79, wherein the error recovery circuit uses a pixel error recovery process.

83. The apparatus as set forth in claim 82, wherein the error recovery circuit uses a classified adaptive pixel error recovery process.

84. The apparatus as set forth in claim 79, further comprising a pixel error flag circuit configured to receive error flags indicative of errors with respect to data of the bitstream, said error recovery circuit further configured to performing error recovery on the data corresponding to received error flags.

85. The apparatus as set forth in claim 79, wherein the error recovery circuit performs error recovery on at least one block of data.

86. The apparatus as set forth in claim 79, further comprising:
  a decoder coupled to receive and decode at least a portion of the bitstream of encoded image data;
  a data degradation prevention unit coupled to the decoder and the error propagation detection circuit and configured to perform a block unit recovery process on the decoded data in block units in which errors due to error propagation are detected.

87. A computer readable medium comprising instructions, which when executed in a processing system, causes the system to perform recovery of data, comprising:
  generating hypotheses for lost/damaged data within the bitstream, wherein each hypothesis specifies a decoding for the lost/damaged data;
  assembling a score distribution using the hypotheses;
  detecting errors in data due to error propagation within a bitstream of encoded image data if the score distribution is within a range defined by a threshold; and
  performing a data error recovery process on data with detected errors.

88. The computer readable medium as set forth in claim 87, wherein the bitstream further comprises data selected from the group consisting of correlated data and audio data.

89. The computer readable medium as set forth in claim 87, wherein performing a data error recovery process on data comprises using a pixel error recovery process.

90. The computer readable medium as set forth in claim 87, further comprising instructions, which when executed performing a process comprising receiving error flags indicative of errors with respect to data of the bitstream, the instructions which when executed perform a data error recovery process further comprising performing the data error recovery process on the data corresponding to received error flags.

91. The computer readable medium as set forth in claim 87, wherein a data error recovery process is applied to at least one block unit of data.

92. The computer readable medium as set forth in claim 91, further comprising instructions, which when executed, perform a process comprising:
  decoding at least a portion of the bitstream of encoded image data;
  preventing data degradation by performing a block unit recovery process on the decoded data in block units in which errors due to error propagation are detected, preventing performed prior to performing a data error recovery process.

\* \* \* \* \*